US006626048B1

(12) United States Patent
Dam Es et al.

(10) Patent No.: US 6,626,048 B1
(45) Date of Patent: Sep. 30, 2003

(54) MAGNETIC FLOW METER

(75) Inventors: Andrew Nicholas Dam Es, Cambrdige (GB); James Mark Carson England, Cambridge (GB); Ross Peter Jones, Cambridge (GB); Richard John Topliss, Cambridge (GB); Iain Ansell, Suffolk (GB); Nicholas Collier, Cambridge (GB); Graham Lodge, Cambridge (GB); Miles William Noel Hember, Cambridge (GB)

(73) Assignee: Sensus Technologies Inc., PA (US)

( * ) Notice: Subject to any disclaimer, the term of this patent is extended or adjusted under 35 U.S.C. 154(b) by 0 days.

(21) Appl. No.: 09/806,257

(22) PCT Filed: Sep. 28, 1999

(86) PCT No.: PCT/GB99/03219
§ 371 (c)(1),
(2), (4) Date: Jul. 9, 2001

(87) PCT Pub. No.: WO00/19174
PCT Pub. Date: Apr. 6, 2000

(30) Foreign Application Priority Data

Sep. 29, 1998 (GB) ................................. 9821159
Jun. 17, 1999 (GB) ................................. 9914189

(51) Int. Cl.[7] ................................. G01F 1/58
(52) U.S. Cl. ................................. 73/861.13; 73/861.15
(58) Field of Search ................................. 73/861.13, 861.12, 73/861.08

(56) References Cited

U.S. PATENT DOCUMENTS

| | | |
|---|---|---|
| 2,691,303 A | 10/1954 | De Boisblanc |
| 3,783,687 A | 1/1974 | Mannherz et al. |
| 3,911,742 A | 10/1975 | Kolin |
| 3,999,443 A | 12/1976 | Appel et al. |
| 4,195,515 A | 4/1980 | Smoll |
| 4,253,340 A | 3/1981 | Schmoock |
| 4,308,753 A | 1/1982 | Olson |
| 4,309,909 A | 1/1982 | Grebe, Jr. et al. |
| 4,339,958 A | 7/1982 | Shauger |
| 4,351,189 A | 9/1982 | Gray et al. |
| 4,417,479 A | 11/1983 | Schmoock et al. |
| 4,434,666 A | 3/1984 | Hemp et al. |
| 4,462,060 A | 7/1984 | Schmoock |
| 4,672,331 A | 6/1987 | Cushing |
| 4,716,769 A | 1/1988 | Yamada |
| 5,325,728 A | 7/1994 | Zimmerman et al. |
| 5,351,554 A | 10/1994 | Budmiger |
| 5,417,118 A | 5/1995 | Lew et al. |
| 5,551,306 A | 9/1996 | Scarpa |
| 5,583,299 A | 12/1996 | Murase |
| 5,691,484 A | 11/1997 | Feller |
| 5,767,418 A | 6/1998 | Davis |

FOREIGN PATENT DOCUMENTS

| | | |
|---|---|---|
| EP | 0 069 456 A1 | 1/1983 |
| GB | 1 225 872 | 3/1971 |
| GB | 1 551 007 | 8/1979 |

*Primary Examiner*—Edward Lefkowitz
*Assistant Examiner*—Takisha S Miller
(74) *Attorney, Agent, or Firm*—Finnegan, Henderson, Farabow, Garrett & Dunner L.L.P.

(57) ABSTRACT

A magnetic flow meter includes a cylindrical vessel within which electrodes are placed directly opposite each other about a magnetically permeable core. In that way, two flow channels are obtained in the vessel. A common magnetic field is applied across both flow channels. The magnetic flow meter is used in conjunction with a controller which monitors amplitude modulated signals representative of applied magnetic field and induced electric field. These amplitude modulated signals are passed to Sigma-Delta modulators, which directly digitise the amplitude modulated AC signals into digital pulses. The controller is capable of monitoring reverse flow through the meter, and to store results until forward flow resumes. Moreover, the controller generates a driving signal for coils which generates a magnetic field, the coil being placed in conjunction with a capacitor which causes resonance. This reduces power consumption by the coil in driving the meter.

33 Claims, 18 Drawing Sheets

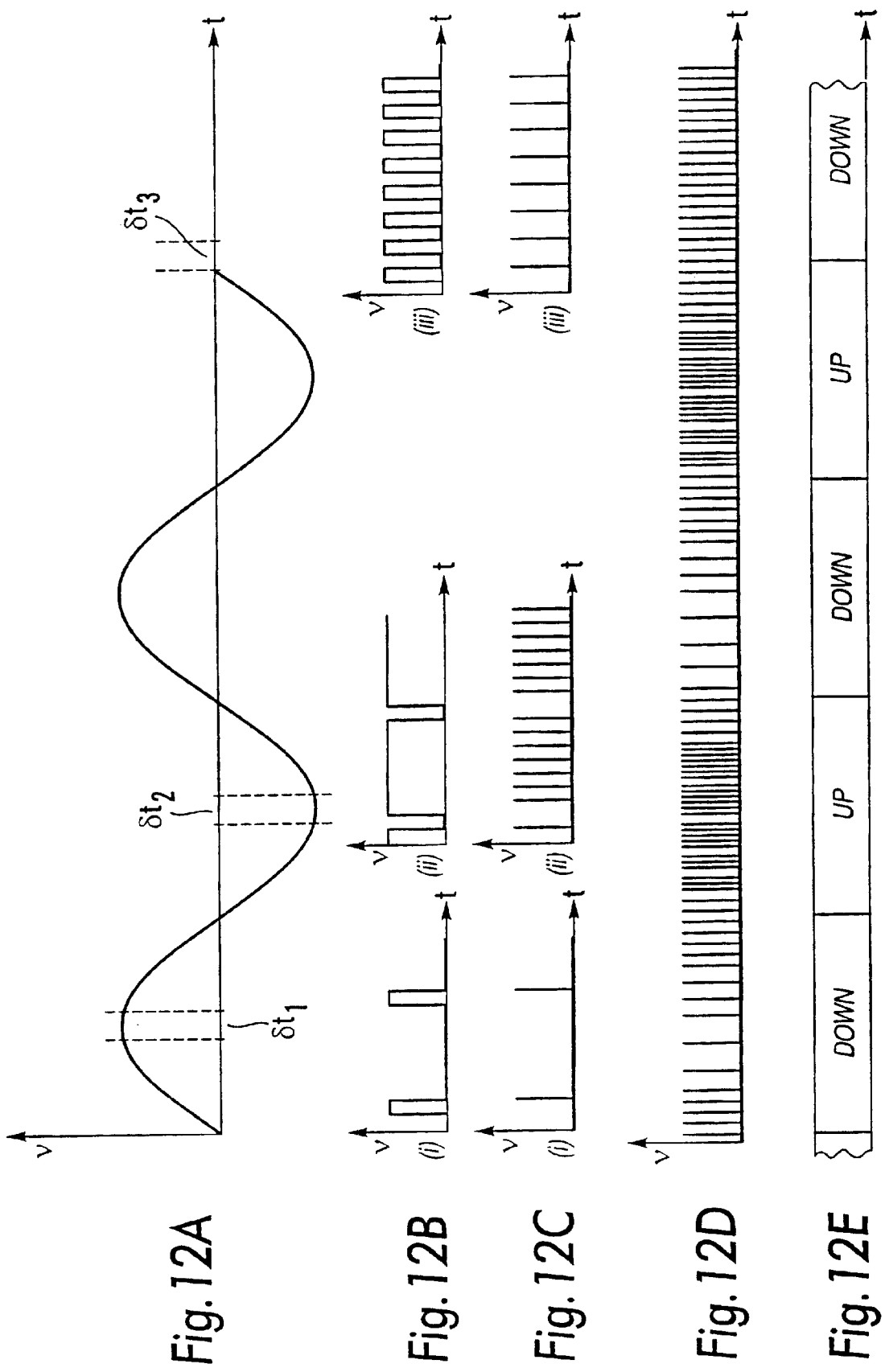

MAGNETIC FLOW METER

The present invention is concerned with magnetic flow meters, and particularly, but not exclusively, with magnetic flow meters for the metering of water consumption.

A magnetic flow meter can be used to measure the flow of an electrically conductive fluid along a flow path. The meter is operative to apply a magnetic field across the flow path, on the principle that a conductor moving in a magnetic field causes the induction of a voltage across the conductor. In the case of the fluid flow meter, the conductor in question is the fluid (being water, or an aqueous solution). The direction of the induced voltage is mutually perpendicular to the direction of flow and the direction of the magnetic field.

U.S. Pat. Nos. 3,911,742 and 4,716,769 describe radial field magnetic flow meters. The device described in U.S. Pat. No. 3,911,742 is for use with a catheter tube. As such, it consists of an elongate wand containing a device from which a magnetic field emanates radially. The voltage, or electrostatic field, induced by the flow of water (or other electrically conductive fluid) parallel with the longitudinal axis of the wand, will circulate around the wand. Two electrodes are placed on the surface of the wand, and an electrically insulating septum extending radially from the wand is positioned between the electrodes. The electrostatic field induced about the wand is interrupted by the septum and its magnitude is then measured.

U.S. Pat. No. 4,716,769 describes another meter, which is of similar construction to that described in U.S. Pat. No. 3,911,742, except that it further comprises a body surrounding the wand and septum previously described.

A first aspect of the invention provides a magnetic flow meter including two flow passages, means for applying a magnetic field across both passages, and means for measuring induced voltage in at least one of the passages, including means for shaping the magnetic field applied in use such that the field is substantially perpendicular to the direction of flow and to the direction in which induced voltage is measured.

The invention provides a meter capable of measuring flow with a degree of immunity to asymmetric flow profiles. In that way, flow need not be conditioned upstream of the meter, for example by means of a long stretch of straight piping.

A second aspect of the invention provides a magnetic flow meter including a flow passage, means external of the flow passage for applying a magnetic field across the flow passage, and means for measuring induced voltage in said flow passage, further comprising means within the flow passage for shaping the applied magnetic field in use.

A third aspect of the invention provides a magnetic flow meter comprising a body, a vessel having first and second ends, the vessel defining a flow channel between said ends, and measurement means supported on an anchor of said body for measuring flow within said channel and wherein said anchor extends within said vessel from one or both of said first and second ends.

A fourth aspect of the invention provides a magnetic flow meter including a flow chamber of annular cross-section, and means for defining a magnetic field radially of the flow chamber.

A fifth aspect of the invention provides a magnetic flow meter comprising a flow chamber, means for generating a magnetic field in said chamber and means for measuring voltage induced thereby, wherein the means for generating a magnetic field is at least partially resonant.

A sixth aspect of the invention provides a measurement device including means for receiving an amplitude modulated AC signal and means for converting a signal directly received by the receiving means into a series of coded pulses for digital processing thereof.

In accordance with that sixth aspect, the measurement device preferably comprises means for receiving an amplitude modulated signal representative of an applied magnetic field in a magnetic flow meter and means for receiving an amplitude modulated signal representative of an induced electrostatic field in the magnetic flow meter, and wherein first and second signal conversion means are provided, each being operative to separately directly encode a respective one of said received signals into a stream of coded pulses.

In accordance with that sixth aspect, the measurement device preferably includes analogue to digital conversion means operable to convert an amplitude modulated signal to a digital signal and digital integration means operable to integrate said digital signal.

The digital integration means may include means for rejecting crossover distortion in the output thereof.

A seventh aspect of the invention provides a water meter comprising means defining a water flow channel, means for applying a magnetic field across the channel, and means for measuring a voltage induced in water in said channel in use, wherein said meter includes means for shaping said magnetic field within a volume of the flow channel identified for measurement, such that said field is substantially perpendicular to the direction of induced voltage measured by said measuring means, in use.

Specific and preferred embodiments of the invention will now be described with reference to the accompanying drawings, in which:

FIG. 11 is a schematic circuit diagram of a second order Sigma-Delta modulator of the analogue sense amplifying unit illustrated in FIG. 9;

FIG. 12A is a graph against time showing a signal input in use to the Sigma-Delta modulator illustrated in FIG. 11;

FIG. 12B(i) is a graph against time on a time scale expanded relative the scale in FIG. 12A showing a first intermediate demodulated signal for a first sample time period indicated in FIG. 12A;

FIG. 12B(ii) is a graph against time on a time scale expanded relative the scale in FIG. 12A showing a first intermediate demodulated signal for a second sample time period;

FIG. 12B(iii) is a graph against time on a time scale expanded relative the scale in FIG. 12A showing a first intermediate demodulated signal for a third sample time period;

FIG. 12C(i) is a graph against time on the same time scale as in FIG. 12B (ii), showing a second intermediate demodulated signal for the first sample time period;

FIG. 12C(ii) is a graph against time on the same time scale as in FIG. 12B(ii), showing a second intermediate demodulated signal for the second sample time period;

FIG. 12C(iii) is a graph against time on the same time scale as in FIG. 12B(iii), showing a second intermediate demodulated signal for the third sample time period;

FIG. 12D is a graph against time on the same time scale as in FIG. 12A showing the second intermediate demodulated signal as illustrated in FIGS. 12C(i), 12C(ii) and 12C(iii) for the time period represented in FIG. 12A;

FIG. 12E is a graph against time on the same time scale as in FIG. 12A showing a third intermediate demodulated signal for the time period represented in FIG. 12A;

Figure 1:
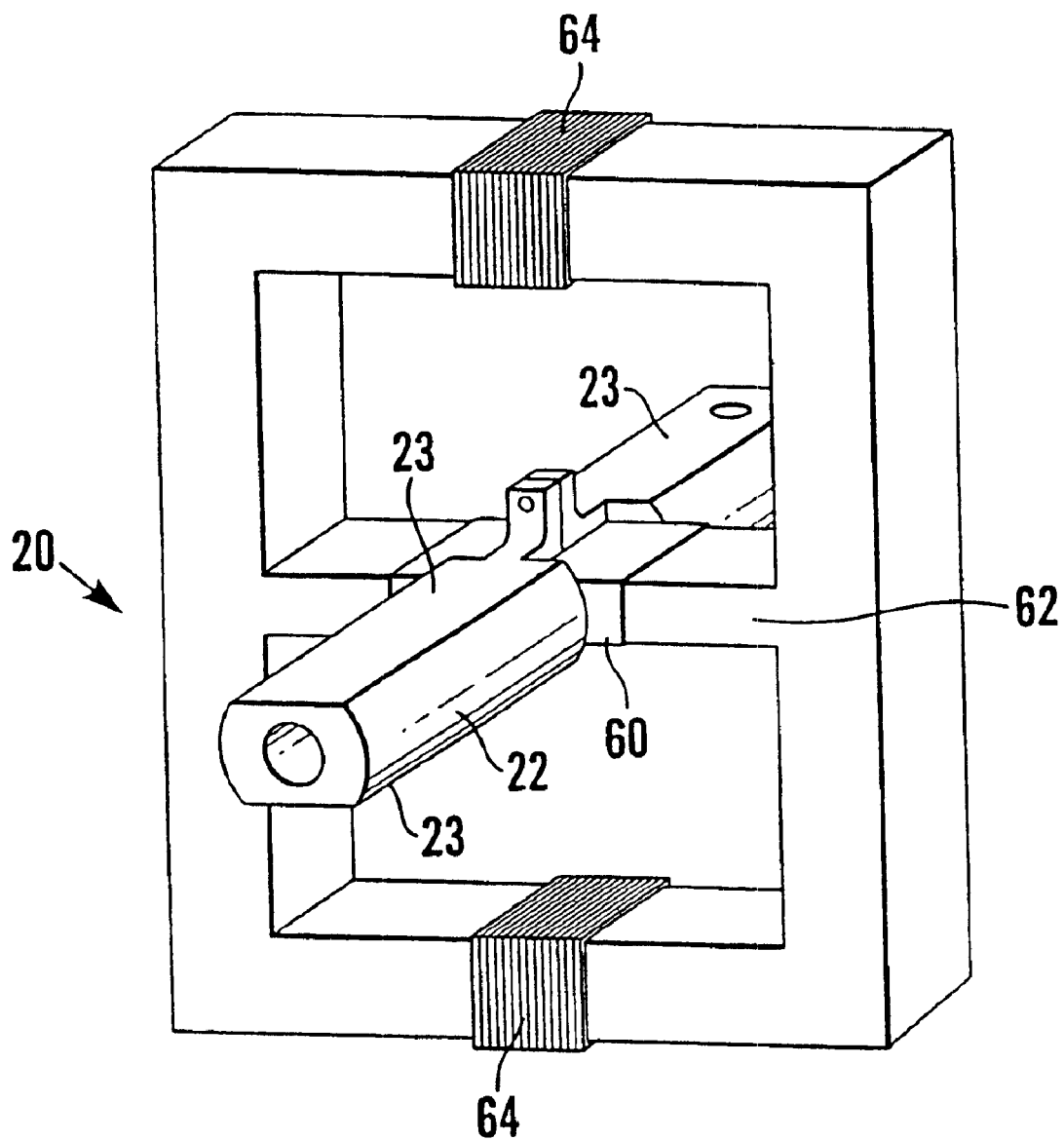
FIG. 1 is a perspective view of a magnetic flow meter in accordance with a first specific embodiment of the present invention.
Figure 2:
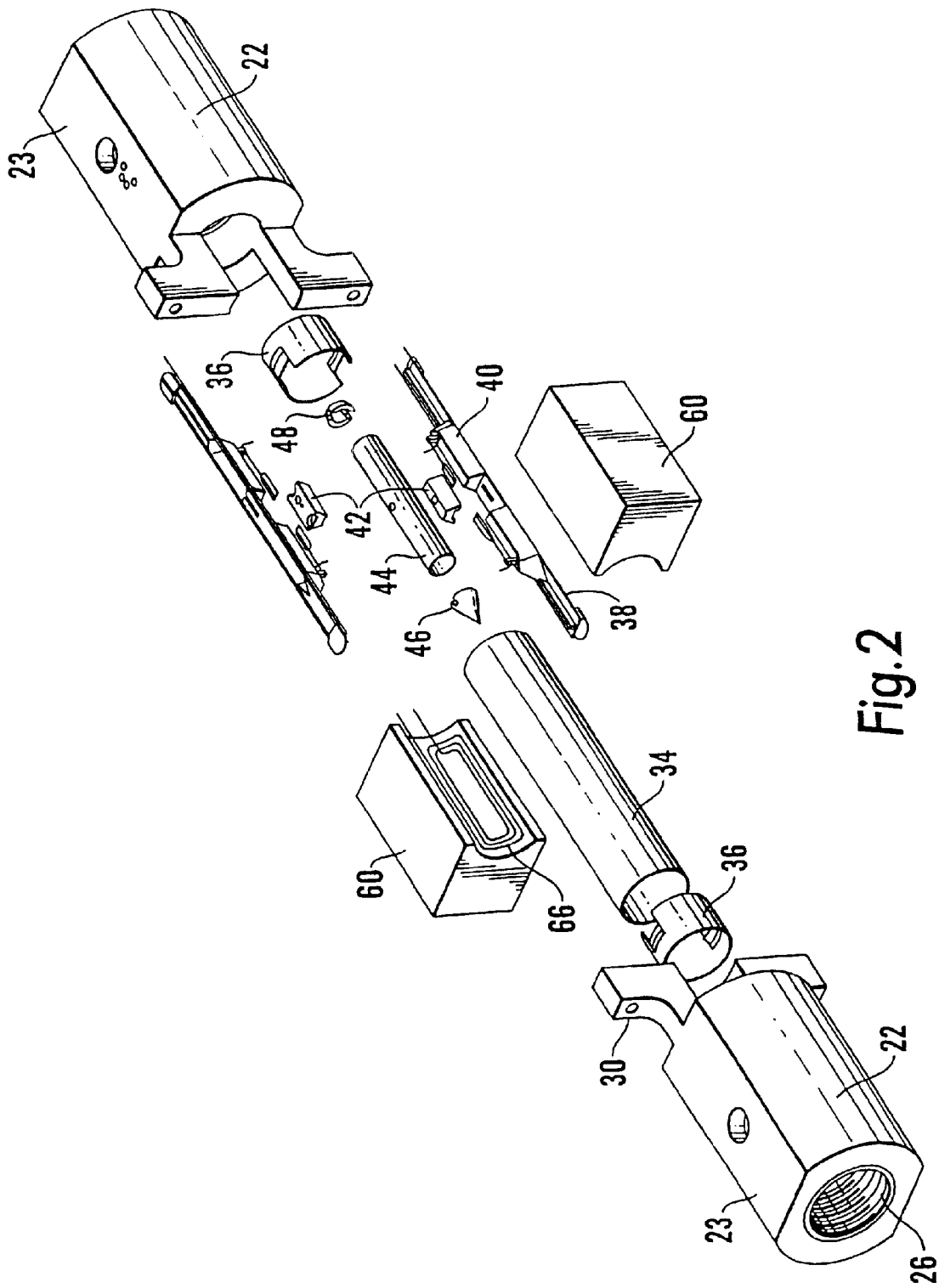
FIG. 2 is a perspective view of the magnetic flow meter illustrated in FIG. 1, exploded for illustration of its component parts.
Figure 3:
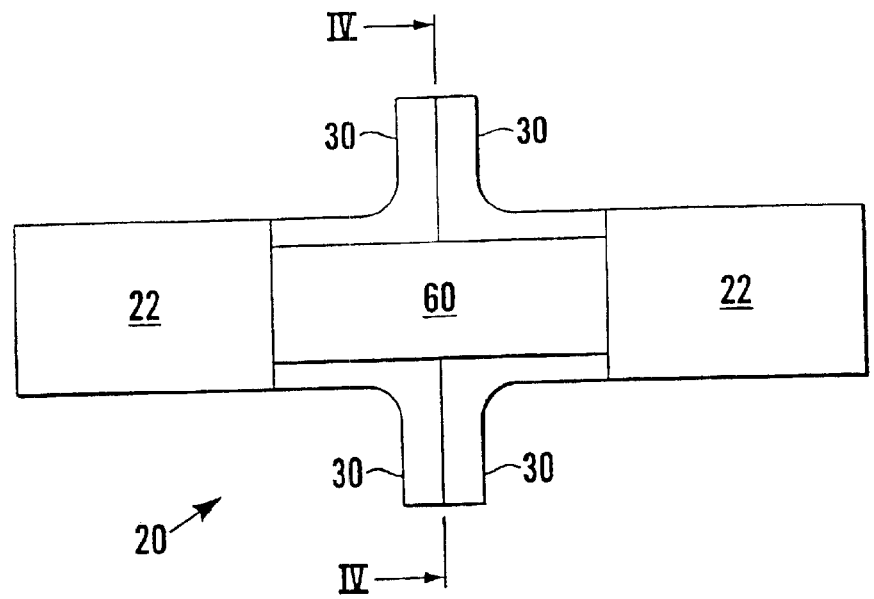
FIG. 3 is a side view of the magnetic flow meter illustrated in FIG. 1.
Figure 4:
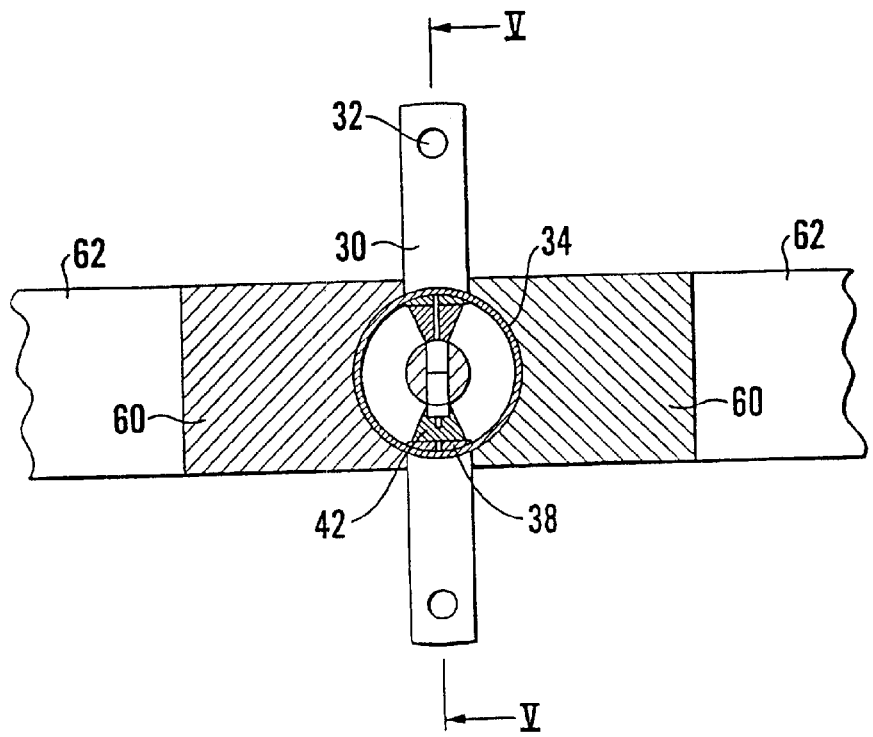
FIG. 4 is a cross-section of the magnetic flow meter illustrated in FIG. 1, in the direction of arrows IV—IV indicated in FIG. 3.

As illustrated in FIGS. 1 to 5, a flow meter 20 comprises two complementary body portions 22. The body portions 22 should be of a magnetically non-permeable material, and preferably non-conductive. Common engineering plastics, and some relatively non-conductive metals, are appropriate materials. Each body portion 22 is substantially cylindrical, with upper and lower parallel flat faces 23 for location of the meter against mounting fixtures (not shown).

Each body portion 22 has an axially extending bore 24 through its length. The bore 24 is of generally uniform diameter, except for a portion 26 at one end of the bore 24 which is wider. That wider portion 26 is internally threaded to co-operate with an external thread of a connecting pipe (not shown), or with a fitting for connection to a connecting pipe. A shoulder 28 between the wider portion 26 of the bore 24 and the remainder of the bore 24 is arranged so that a pipe can abut against it. The difference in diameter of the wider portion 26 from the remainder of the bore 24 may be selected so that the remainder of the bore 24 has the same internal diameter as a connecting pipe connected to the meter, thereby limiting drag in the flow of fluid within the flow path.

Each body portion 22 has upper and lower assembly lugs 30 located on the opposite end thereof from the threaded portion 26 of the bore 24. Each assembly lug 30 extends away from the body portion 22 in an axial direction, and then radially thereof to define an "L" shape. The radially extending portion of each assembly lug 30 includes an assembly bore 32 extending therethrough in a direction parallel to the bore 24 of the body portion.

The two body portions 22 are axially aligned so that the assembly lugs 30 abut each other, and the assembly bores 32 align with each other. Assembly bolts 31 are passed through the aligned assembly bores 32, and engaged with nuts 33 to fix the body portions 22 together. Before fixing, a tubular pressure vessel 34 is assembled within the bore 24 of the body portions 22. The tubular pressure vessel 34 fits tightly in the bores 24. Alternatively or in addition to the tight fit, sealing means such as O-rings, sealant compound, glue or the like could be interposed between the pressure vessel 34 and each of the body portions 22 so as to avoid the escape of water from the flow path through the meter.

The pressure vessel 34 is constructed of titanium. Titanium is selected as it has relatively high strength, and negligible magnetic permeability. The high strength of titanium means that strain in the wall of the vessel due to fluid pressure within the meter can be maintained, under normal operating conditions, within a predetermined (low) range. Moreover, titanium has sufficiently high electrical resistivity that eddy currents in the pressure vessel walls are kept acceptably low. It will be understood that other materials which meet these criteria would also be acceptable for use in the construction of the pressure vessel 34.

Fixing rings 36 are placed at either end of the pressure vessel 34, for supporting two support members 38 within the pressure vessel 34. The support members 38 extend throughout the length of the pressure vessel 34. The support members 38 are supported on the fixing rings 36 so as to be diametrically opposed across the pressure vessel 34. Each support member 38 has two axially spaced flow dividers 40. Each flow divider 40 is streamlined at an end distal the other flow divider, and is defined by two radial planes of the pressure vessel 34 which subtend an angle of approximately 45° at the longitudinal central axis of the pressure vessel 34. The flow divider 40 extends into the tube a distance of about half of the radius of the pressure vessel 34 from the inner wall thereof.

Each support member 38 supports an electrode 42, interposed between the two flow dividers 40. Each electrode 42 is of graphite material. The graphite electrodes 42 are of the same cross-section as the flow dividers 40. The end faces 43, i.e. those faces generally transverse to the pressure vessel 34, of each electrode 42 are substantially perpendicular to the longitudinal axis of the pressure vessel 34.

Figure 5:
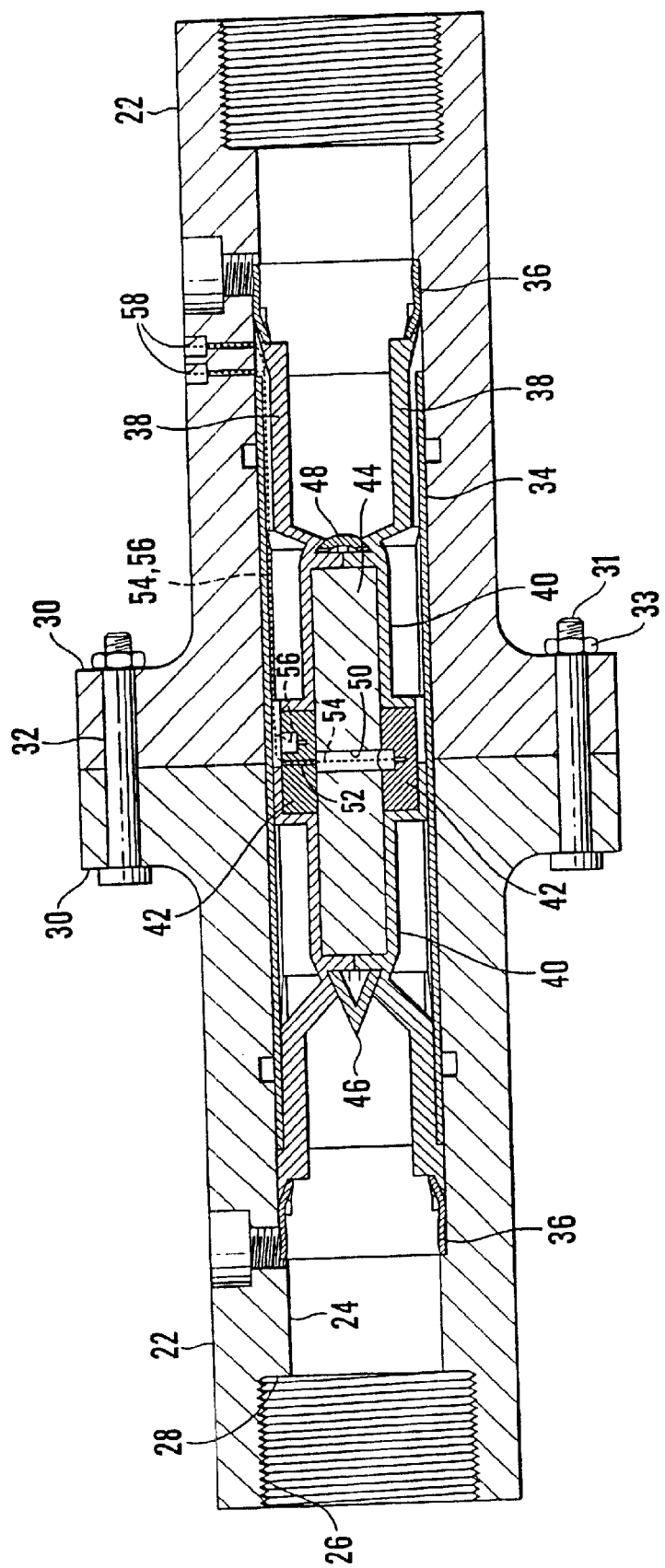
FIG. 5 is an axial sectional view of the magnetic flow meter illustrated in FIG. 1, in the direction of arrows V—V indicated in FIG. 4.
Figure 6:
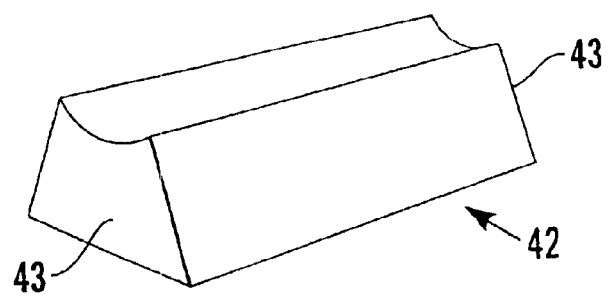
FIG. 6 is a perspective view of an electrode of the magnetic flow meter illustrated in FIG. 1.

Other arrangements for supporting the electrodes and for dividing the flow in the meter could be provided. An advantage of the arrangement illustrated in FIG. 5 is that the supports extend axially beyond the pressure vessel 34, removing the requirement for fixings in the metrologically most sensitive part of the meter which could have a deleterious effect on the performance of the meter.

Graphite is chosen because it has suitably low surface impedance, it is relatively soft so as to enhance manufactureability, it is durable and it is suitably electrically non-noisy on the other hand, platinum has been found to be acceptable (but is somewhat more expensive than graphite), and conductive ceramic electrodes, such as Ebonex or the like, could also be considered.

In the region of the electrodes 42, the interior of the pressure vessel 34 is coated with an electrically insulating coating, such as Parylene, in order to reduce the effect of the conductivity of the pressure vessel 34 on electrostatic field distribution near the electrodes 42.

A cylindrical core 44 of magnetically permeable material is placed between the two support members 38 and associated electrodes 42, aligned axially and centrally of the titanium tube 38. The material for the core is selected to have high magnetic permeability, low remanence, and low conductivity to reduce eddy currents. Materials which are relatively chemically inert, which provide increased resistance to corrosion, are preferred; alternatively, a protective coating could be employed. Standard barium or zinc ferrites, or powdered iron, could be employed.

At one end of the magnetic core 44, there is a conical flow smoothing cap 46, and at the other end a generally hemispherical flow smoothing cap 48 is placed. In use, the meter is intended to be connected so that the conical flow smoothing cap 46 is at the normally downstream end of the meter, and the hemispherical flow smoothing cap 48 is at the normally upstream end of the meter. In this way, turbulence can be avoided or at least minimised, thereby causing drag in the meter to be minimised.

A pair of pole pieces 60 are arranged either side of the body portions 22. The pole pieces 60 engage with the portion of the pressure vessel 34 between the two body portions 22 and with the lugs 30. The pole pieces 60 are generally cuboidal in shape, with part cylindrical cutouts to correspond with the outer surface of the pressure vessel 34. The pole pieces 60 are placed either side of the pressure vessel 34, and are arranged with a yoke 62 with upper and lower coils 64 for the application of a magnetic field between the two pole pieces 60.

The pole pieces 60 are generally precision machined, to fit accurately against the pressure vessel 34. A pick-up coil 66 is interposed between one of the pole pieces 60 and the pressure vessel 34. The pick-up coil 66 is arranged to measure the magnetic field applied by the pole pieces 60 in use. In one arrangement, the pole pieces 60 are precision machined to fit accurately against the lugs 30. In that way, asymmetry brought about by the presence of a pick-up coil 66 can be avoided. Alternatively or additionally, a further pick-up coil could be interposed between the other pole piece 60 and the pressure vessel 34; this further pick-up coil could either be connected in series for additional magnetic flux linkage, or left disconnected as a dummy coil, merely to enhance the symmetry of the meter.

Figure 7:
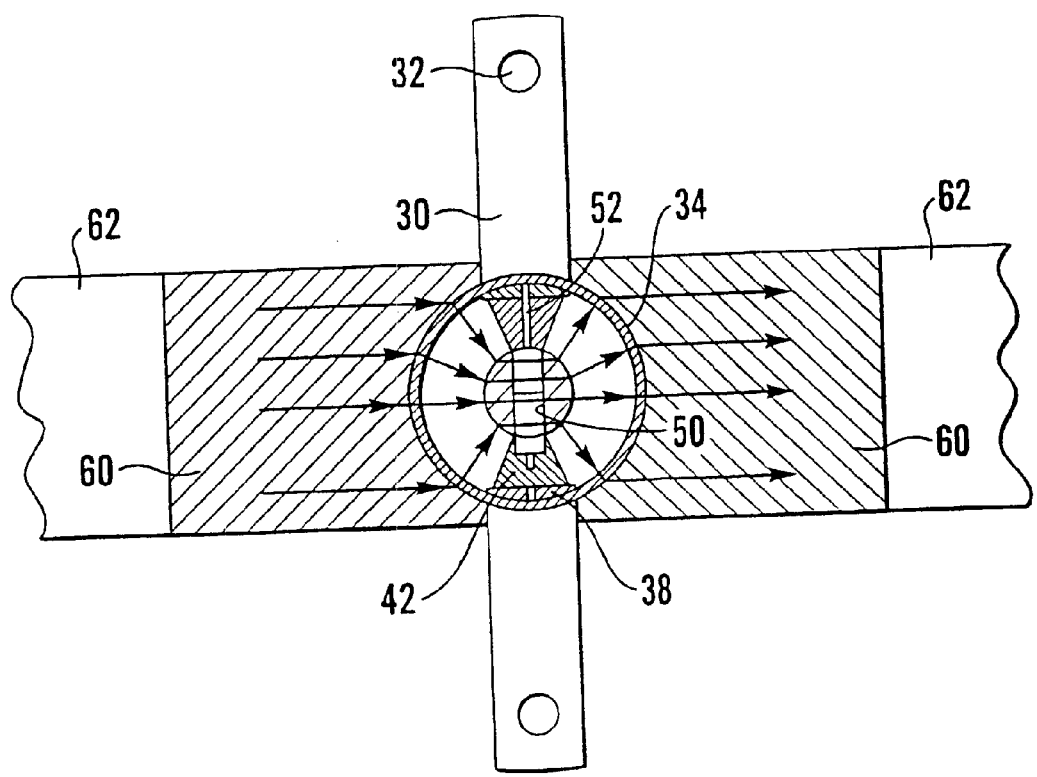
FIG. 7 is a detailed cross-section of the magnetic flow meter illustrated in FIG. 1, illustrating the distribution, in use, of a magnetic field therein.

The magnetic field applied by the pole pieces 60 is best illustrated by example in FIG. 7. The presence of the magnetic core 44 distorts the magnetic field between the pole pieces 60 such that the magnetic field (as illustrated by lines of flux) generally extends radially between the wall of the pressure vessel 34 and the magnetic core 44, and then from the magnetic core 44 to the opposite wall of the pressure vessel 34.

The flow channel defined between the pressure vessel 34 and the magnetic core 44 is divided into two generally equal parts by the diametrically opposed electrodes 42. In each part of the flow channel, the meter in operation has a magnetic field whose lines of flux extend radially between the pressure vessel 34 and the magnetic core 44.

Any electrostatic field induced in the part of the flow channel in question will be in a direction perpendicular to the magnetic field flux lines. Accordingly, the electrostatic field lines will generally circulate about the core 44.

Therefore, it is clearly convenient to dispose the faces of the electrodes, in contact with the fluid in the flow channel, radially of the part-annular flow channel.

By supporting the pressure vessel 34, the electrodes 42 and the core 44 directly from the body portions 22, rather than supporting the electrodes 42 and core 44 from the pressure vessel 34, the pressure vessel 34 need not be designed to accommodate the function of supporting other components. Instead, the design of the pressure vessel 34 is governed by its ability to withstand pressure differentials without substantial strain, and by its substantial lack of impact on the magnetic and electrical circuits of the meter. This is advantageous, since the pressure vessel can be designed to match those criteria more closely if other factors can be removed from consideration.

The geometry of the components described above is preferably constrained within predetermined ranges., so as to enhance performance of the meter. Suitable constraints will now be described.

A first constraint preferably applied to the geometry concerns an angle θ, defined as the angle subtended at the centre of the tube by one of the two flow paths through the meter. Generally, maximising θ is advantageous in that it provides a maximum signal to noise ratio, and minimises pressure drop in the meter. However, if θ is too large, then the electrodes do not present a wide enough geometric barrier to magnetic flux, causing flux leakage through the electrodes to become unacceptably high. This can cause non-linearities in the behaviour of the meter, which can lead to errors.

A practical limitation on θ can be expressed as follows:

$$\theta < 2\arccos\left(\frac{g}{R}\right) \qquad (1)$$

where g is the gap between the wall of the pressure vessel 34 and the core 44, also known as the working flow gap, and R is the inner radius of the pressure vessel 34. However, it will be appreciated that this is an empirical formula; the maximum value of θ should be determined by reference to the effect described above which is to be avoided.

A second constraint preferably applied to the geometry concerns $L_f$, which is the length, in the axial direction of the meter, over which the magnetic field is applied. This length is equal to the length of the permeable blocks, or pole pieces 60, placed on the outside of the pressure vessel 34, which is equal to the length of the permeable core 44. $L_f$ is limited to ensure that the meter does not apply a significant pressure drop to fluid flowing therethrough. However, in practice, the field applied by the pole pieces 60 tends to bulge outwards at the ends of the pole pieces 60 and core 44. Therefore, $L_f$ must be sufficiently long that the magnetic field applied, in the region in which the electrical current flows between the electrodes 42, is substantially uniformly radial. That constraint can best be represented by the following relation:

$$L_f > L_e + R \cdot \theta \qquad (2)$$

where $L_e$ is the length of the electrodes at the inner wall of the pressure vessel, in the axial direction of the pressure vessel 34. However, it should be appreciated that this is an empirical formula, and that arrangements not satisfying the formula may still deliver the desired effect that the magnetic field in the region between the electrodes is substantially radial.

A third constraint applied to the geometry of the magnetic flow meter concerns the thickness t of the pressure vessel 34, in combination with the magnetic and mechanical properties of the material used in the pressure vessel. The side wall of the pressure vessel 34 presents a radial magnetic reluctance in series with the magnetic gap between one magnetic pole 60 and the core 44, and from the core 44 to the other pole 60. It is desirable to maintain that series reluctance at a minimum in order to obtain a highly magnetically efficient flow meter. This can be achieved by means of a thin walled pressure vessel, a pressure vessel constructed of a material with high permeability, or a combination of both.

However, both thickness and permeability are otherwise constrained. The thickness of the pressure vessel is constrained by the fact that the side wall of the pressure vessel may have to withstand high differential pressures, while exhibiting little strain, and while avoiding mechanical failure. With reference to the required sensitivity and accuracy of the meter, and the expected pressure differentials across the side wall of the pressure vessel, a minimum wall thickness $t_{min}$ can be defined in terms of yield strength and elastic modulus of the material selected for the pressure vessel, such that unacceptably high strain, or mechanical failure of the pressure vessel, can be avoided. By selecting a material with high elastic modulus, $t_{min}$ can be set at a low level, so that the actual wall thickness t can be selected so as to minimise the contribution of the pressure vessel wall to the magnetic reluctance of the meter.

The permeability of the selected material should not be so high as to provide a low reluctance pathway for flux between the two magnetic poles 60, which would divert flux away from the gap between the pressure vessel wall and the core 44, and distort the field within the meter. This latter effect has more influence on the performance of the meter than the influence of the reluctance of the side wall in series with the magnetic pathway between the poles 60 and the core 44. The following relation is provided as a simple constraint on the geometry of the system having regard to the selected material:

$$t < \frac{0.3\,g}{\mu} \quad (3)$$

where $\mu$ is the relative permeability of the material of the pressure vessel 34, and g the radial distance between the interior face of the side wall of the pressure vessel 34 and the surface of the core 44. If a non-permeable material is used, i.e. $\mu$ is approximately equal to 1, as in the case of titanium, then the leakage flux between the poles 60 is most dependent on the separation of the poles 60. This distance is clearly related to the values of θ and t.

A bore 50 extends radially through the magnetically permeable core 44 in the vertical direction as shown in FIG. 5, from adjacent the lower electrode 42 illustrated therein and a corresponding bore 52 extends vertically through the upper electrode 42. A connecting wire 54 leads from the lower electrode 42 through those two bores 50, 52, and along the inner wall of the pressure vessel 34. Another connecting wire 56 is led alongside the aforementioned connecting wire 54 from the upper electrode 42. The two connecting wires are led out of one end of the pressure vessel 34, and through bores 58 in the side wall of one of the body portions 22, adjacent each other. This is an advantageous arrangement in that the two connecting wires 54, 56 can be arranged sufficiently close together that flux linked by the two electrode connecting wires 54, 56 can be minimised. Such flux linkage could lead to erroneous readings of voltage detected at the electrodes 42.

Moreover, by leading the connecting wires out of one end of the pressure vessel 34, there is no need to place holes in the pressure vessel wall. The placement of holes in the pressure vessel wall could weaken the wall, and so the present arrangement allows a thinner walled pressure vessel 34 to be employed than would be possible if the pressure vessel 34 included holes for the passage of connecting wires therethrough.

Figure 8:
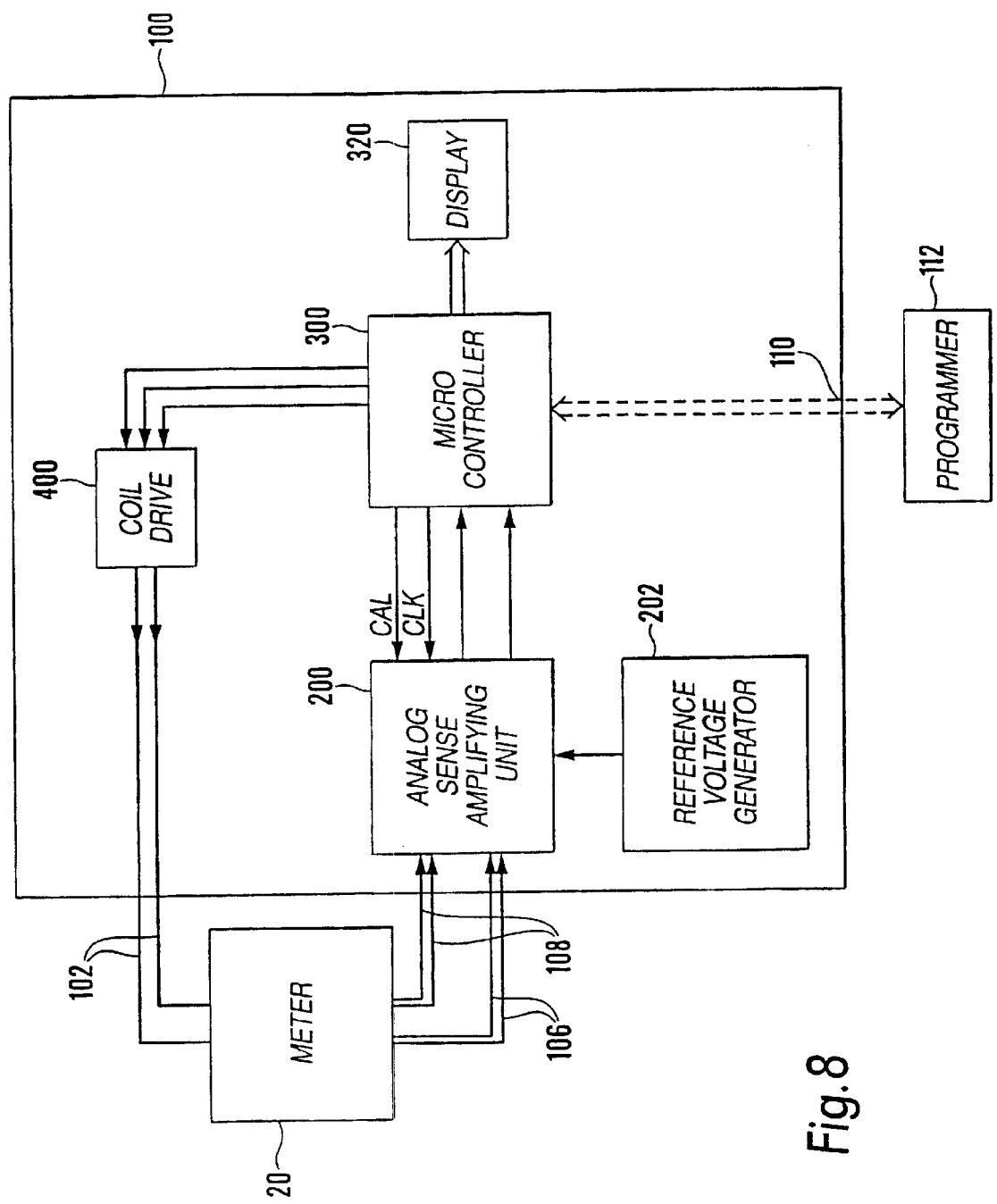
FIG. 8 is a schematic diagram showing the magnetic flow meter illustrated in FIG. 1 arranged with a meter controller.

The meter 20 is connected to a controller 100 as illustrated in FIG. 8. The coils 64 of the meter are connected in parallel to the controller 100 by means of two connecting wires 102. The pick-up coil 66 of the meter 20 is connected to the controller 100 by means of two connecting wires 106. The electrodes 42 of the meter 20 are connected to the controller 100 by means of two connecting wires 108.

The controller 100 comprises an analog sense amplifying unit 200, which receives signals from each of the electrodes 42 and the pick-up coil 66, carried on the connecting wires 108, 106 respectively. The pick-up coil signal is proportional to the magnetic field strength generated between the pole pieces 60 and directed through the flow channels defined between the pressure vessel 34 and the core 44. A reference voltage generator 202 is operative to generate a substantially constant reference voltage for use in the analog sense amplifying unit 200.

The analog sense amplifying unit 200 is operable to generate two digitized signals, one being representative of the induced voltage detected at the electrodes 42, the other being representative of the magnetic field strength detected by the coil. The two signals are passed to a microcontroller 300 which is operative to send signals to a display 320 for the display of information concerning the flow of water through the flow meter 20.

The controller 100 includes a port 110 which allows connection of a programmer 112 thereto, for communication with the microcontroller. Connection may be effected by wireless means, allowing transmission of data to and from the controller as appropriate.

The programmer 112 may be a detachable unit, used in maintenance, repair or inspection of the meter 20, and may not need to be physically connected but may be capable of communicating with the microcontroller 300 remotely such as by infrared communications link. The microcontroller 300 and the programmer 112 could be configured such that establishment of a communications link therebetween may involve authorisation, and/or encryption and decryption, to prevent unauthorised access to the microcontroller 300. This is advantageous when the meter 20 is to be used for the billing of a utility such as water, where a meter reading should not be capable of being accessed, and potentially changed, by anybody other than an authorised representative of the utility supplier.

The controller 100 further includes a coil drive 400, and the microcontroller 300 also produces drive signals for the operation of the coil drive 400. The coil drive 400 is operative to generate a signal to be passed to the coils 64 of the meter 20, to generate a magnetic field through the yoke 62 and through the pole pieces 60.

FIG. 10 shows the analog sense amplifying unit 200 in more detail. The amplifying unit 200 includes an electrode sense amplifier 204 which receives signals, via the connecting wires 108, from the electrodes 42. The electrode sense amplifier 204 amplifies the difference between the two electrode voltages through a gain of approximately 200. This gain is substantial because the amplitude of the voltage detected at the electrodes 42 is likely to be of the order of a millivolt. Therefore, substantial amplification is needed to obtain a signal which can be processed accurately.

The output of the electrode sense amplifier 204 passes through a high pass filter 206 to remove any DC effects which might be introduced by the electrode sense amplifier 204.

The amplifying unit 200 further comprises a B field sense amplifier 208 which receives a signal, via the connecting wires 106, from the pick-up coil 66. The B field sense amplifier 208 has a low frequency gain of approximately 10, and has a low pass cut-off of about 77 Hz, to substantially eliminate any noise picked up by the coil 66. The output of the B field sense amplifier 208 passes to a first order Sigma-Delta modulator 210 which is clocked by a clock signal CLK received from the microcontroller 300. The output of the first order Sigma-Delta modulator 210 comprises a train of digital pulses hereinafter referred to as $B_{MEAS}$.

The output of the B field sense amplifier 208 is also fed through a further high pass filter 212 which rejects DC components which might be introduced by the B-field sense amplifier 208. The outputs of the high pass filters 206, 212 are passed to an analog switch 214, switched by a signal CAL received from the microcontroller 300. The signal CAL is normally set so that the analog switch 214 passes the output from the high pass filter 206 from the electrode sense amplifier 204 therethrough.

The output of the analog switch 214 is passed to an active low pass filter 216, having low frequency gain of approximately 5. The low pass filter 216 is constructed of a 3 pole Butterworth filter. The low pass filter 216 is designed such that at 15 Hz its gain is 3 dB lower than at DC and 50 Hz it is 30 dB lower. The filter 216 therefore rejects high frequency noise, including any artefact of the supply line voltage (normally at 50–60 Hz). Considering that the meter 20 may be used in a water supply and therefore buried in the ground, the rejection of supply voltage is advantageous since the meter 20 may be inadvertently placed close to a high voltage cable at 50–60 Hz, which might otherwise reduce the accuracy of the meter 20.

The output of the active low pass filter 216 is passed to a second order Sigma-Delta modulator 218. The second order Sigma-Delta modulator 218 is clocked by the same clock signal CLK as the first order Sigma-Delta modulator 210 previously described. The output of the second order Sigma-Delta modulator 218 comprises a sequence of digital pulses representing the voltage received from the electrodes 42. The output of the Sigma-Delta modulator 216 is hereinafter referred to as $E_{MEAS}$.

In practice, the low pass filter 216 as described not only has reduced gain at higher frequency, but also introduces phase shift at higher frequency. For example, the output from the filter 216 at 8 Hz will be about 60° ahead of its input. This is undesirable, because any extraneous signal picked up from the magnetic field pick-up coil 64 will already be in quadrature to (i.e. leading by 90°) the signal from the electrodes 42.

Figure 10A:
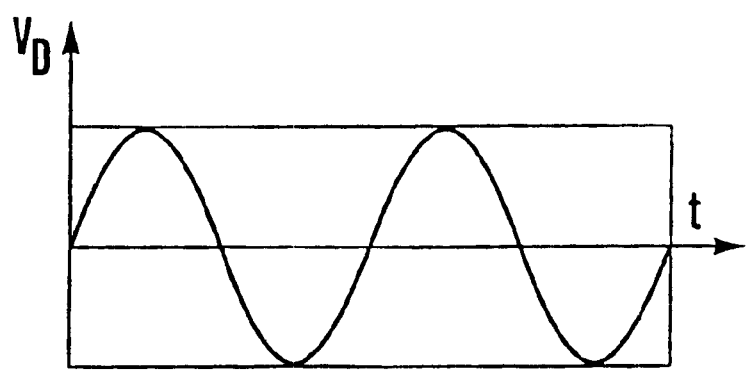
FIG. 10A is a graph against time of a coil drive voltage signal generated by the controller of FIG. 8 during operation.
Figure 10B:
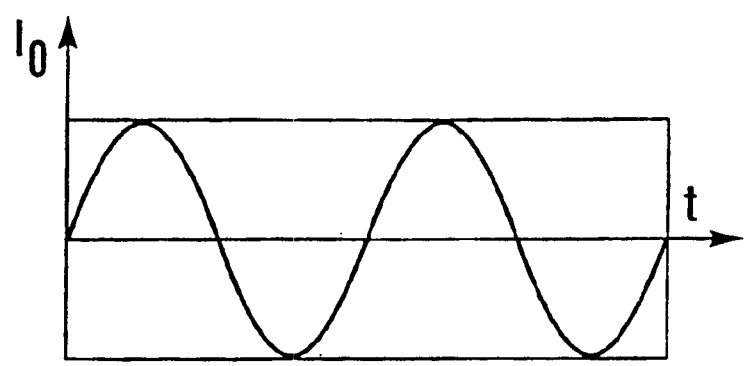
FIG. 10B is a graph against time of a current resultant at a coil drive output of the controller on output of the coil drive voltage signal illustrated in FIG. 10A.
Figure 10C:
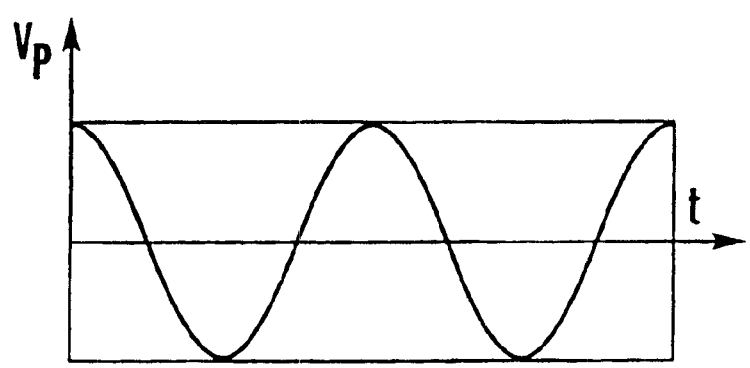
FIG. 10C is a graph against time of a magnetic field pick-up voltage signal received by the controller in use.
Figure 10D:
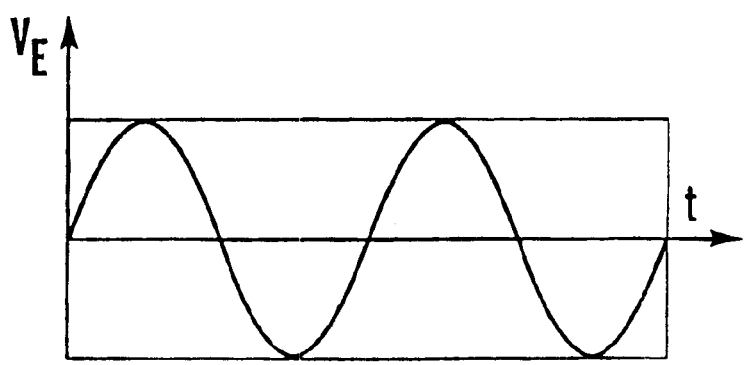
FIG. 10D is a graph against time of an induced voltage signal generated -across the electrodes of the magnetic field flow meter in use.

This is demonstrated most effectively in FIGS. 10A to 10D of the drawings. FIG. 10A shows a trace of the voltage $V_D$ output by the coil drive 400. The second graph, FIG. 10B, shows a trace of current $I_C$ through the coil. This current $I_C$ is in phase with-the drive voltage $V_C$ because the coil drive 400 drives the coil 64 and resonating capacitor 81 at their resonating frequency, i.e. the coil and capacitor behave as if they were a pure resistance. At resonance, the power consumption of the coil has been found to be minimised, as described in more detail later. The third graph, FIG. 10C, shows a trace of the voltage $V_F$ picked up by the pick-up coil 66. This voltage is in phase with the voltage across the coil 64, and so is 90° ahead of the voltage $V_D$ output by the coil drive 400. Finally, the fourth graph, FIG. 10D, shows a trace of the voltage $V_E$ between the electrodes 42. This voltage is in phase with the coil flux, which is in phase with the coil current $I_C$ (FIG. 10B).

The signal received at the active low pass filter 216 may include an artifact of the signal picked up by the pick-up coil 216, even if the analog switch is set so that the filter 94 receives the amplified electrode signal.

Therefore, the existence of further phase shift in the measured signal will reduce the ability of the meter to distinguish between the signals derived from the voltage $V_E$ at the electrodes 42 and an artefact of the voltage driving the magnetic field. The analog switch 214 is provided so that the output from the B field sense amplifier 208 can be selectively passed, via high pass filter 212, through the active low pass filter 216, so as to nullify any artefact from that signal in the measured electrode signal. That process is carried out by means of the microcontroller under the control of software implemented therein, to be described later.

With reference to FIG. 11, the internal structure of the second order Sigma-Delta modulator 218 will now be described. The modulator 218 comprises first and second integration stages 220, 222, sending an output to a comparator 224. The comparator 224 comprises an operational amplifier receiving in its inverting input a reference voltage ($V_{REF}$) generated at the reference voltage generator 202. The operational amplifier receives into its non-inverting input the signal received from the second integration stage 222 and to be compared with $V_{REF}$. The comparator 224 sends an output to the data input of a D type latch 226, clocked by the clock signal CLK received from the microcontroller 300. The non-inverted output Q of the D type latch 226 is sent as a reset signal RESET2 to the second integration stage 222, and the inverted output −Q of the D type latch 226 is sent as a reset signal RESET1 to the first integration stage 220. The inverted output −Q is also fed to an input of a two input AND gate 228, the other input of the AND gate 228 being fed from the clock signal CLK. The output of the AND gate 228 is the output $E_{MEAS}$ of the Sigma-Delta modulator 218.

The operation of the second order: Sigma-Delta modulator 218 will be understood from the graphs illustrated in FIGS. 12A to 12E. FIG. 12A is a graph of the analog input $E_{SIG}$ to the Sigma-Delta modulator over time. The Sigma-Delta modulator converts the input voltage into a series of pulses at the inverted output −Q of the D type latch 226. Those pulses represent charge balancing pulses supplied to the integration stages 220, 222 through the reset inputs thereof. FIGS. 12B(i), 12B(ii) and 12B(iii) illustrate three cases-of possible signals in the Sigma-Delta modulator, over an expanded time axis relative FIG. 12A, corresponding to respective periods of time $\delta t_1$, $\delta t_2$, $\delta t_3$ illustrated in FIG. 12A indicated by broken lines.

In FIG. 12B(i), corresponding to a time period $\delta t_1$, near a peak of the signal illustrated in FIG. 12A, the inverting output −Q of the D type latch 226 is mostly digital LOW with infrequent pulses of digital HIGH voltage. In contrast, as shown in FIG. 12B(ii), in the period $\delta t_2$, at a minimum of the input voltage illustrated in FIG. 12A, the inverted output −Q of the latch 226 is mostly digital HIGH with infrequent digital LOW pulses. In the period $\delta t_3$, when the input voltage is on or around cross-over, the inverted output −Q of the latch 226 has a mark-to-space ratio of approximately 1, as shown in FIG. 12B(iii).

The inverted output −Q of the latch 226 is used as a gate for controlling the transmission of the 32 kHz clock signal CLK, received from the microcontroller 300, through the AND gate 228. The output of the gate 228 corresponding with each of the three time periods described above is illustrated in FIGS. 12C(i), 12C(ii) and 12C(iii). In period $\delta t_1$, the infrequent HIGH pulses are translated into infrequent samples of the CLK pulses; in period $\delta t_2$, the gate 228 admits most CLK pulses through to the output, with infrequent suppression of pulses; in period $\delta t_3$, the gated output comprises pulses corresponding to approximately every other CLK pulse.

FIG. 12D illustrates the gated clock output $E_{MEAS}$ corresponding with the input voltage illustrated in FIG. 12A, and in the same time axis as FIG. 12A. This graph shows how pulses are concentrated in regions of high input voltage, and how concentration of pulses diminishes as voltage reduces.

Figure 13:
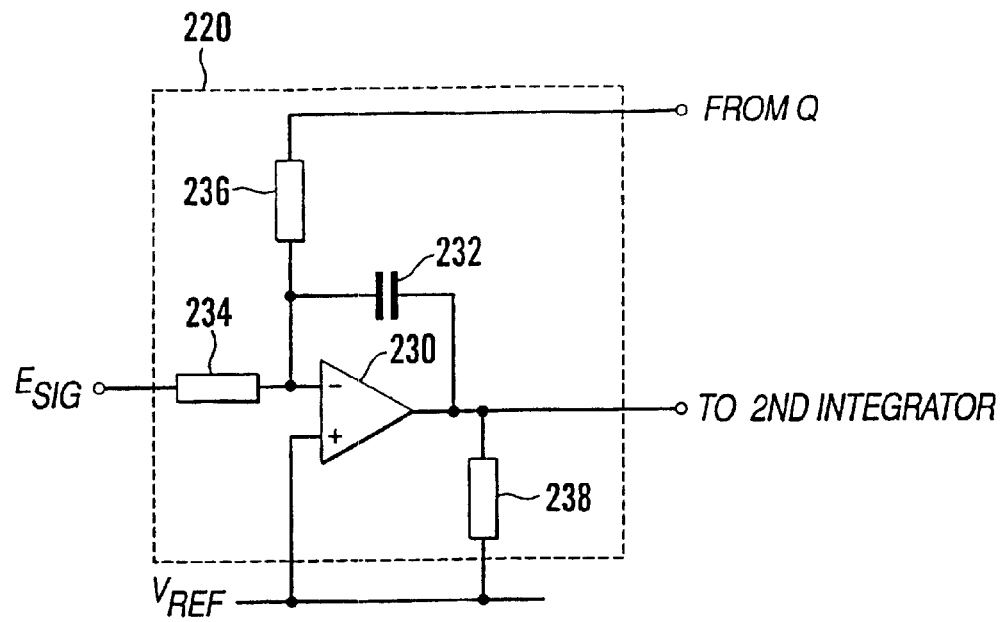
FIG. 13 is a circuit diagram of a first integrator of the Sigma-Delta modulator illustrated in FIG. 11.

FIG. 13 illustrates in further detail the first integrator 220 included in the second order Sigma-Delta modulator 218.

The first integrator 220 comprises an operational amplifier 230 which receives reference voltage $V_{REF}$ in its non-inverting input and which has an integrating capacitor 232 arranged in negative feedback across it in the conventional manner. The operational amplifier 230 receives through summing input resistors 234, 236 input currents generated by the application on the one hand of an input voltage $E_{SIG}$ from the analog switch 214 and an the other hand the inverted output −Q of the D type latch 226. The summing resistors 234, 236 are selected to be in the order of 1–10 MΩ in order to minimise current through the Sigma-Delta modulator.

A resistor 238 is arranged between the output of the operational amplifier 230 and the reference voltage. The resistor 238 is generally about three orders of magnitude smaller than the summing input resistors 234, 236. Despite the fact that this resistor 238 will increase the power consumption of the modulator, it allows for the rejection of cross-over distortion generated as a result of imperfections in the output stage of the operational amplifier 230. This is because, since the summing input resistors 234, 236 are relatively large, the integrating capacitor 232 will charge and discharge relatively slowly. The resistor 238 will assist in movement of charge onto or off the capacitor 232, which will assist with balancing the integrator 220 at crossover.

Figure 14:
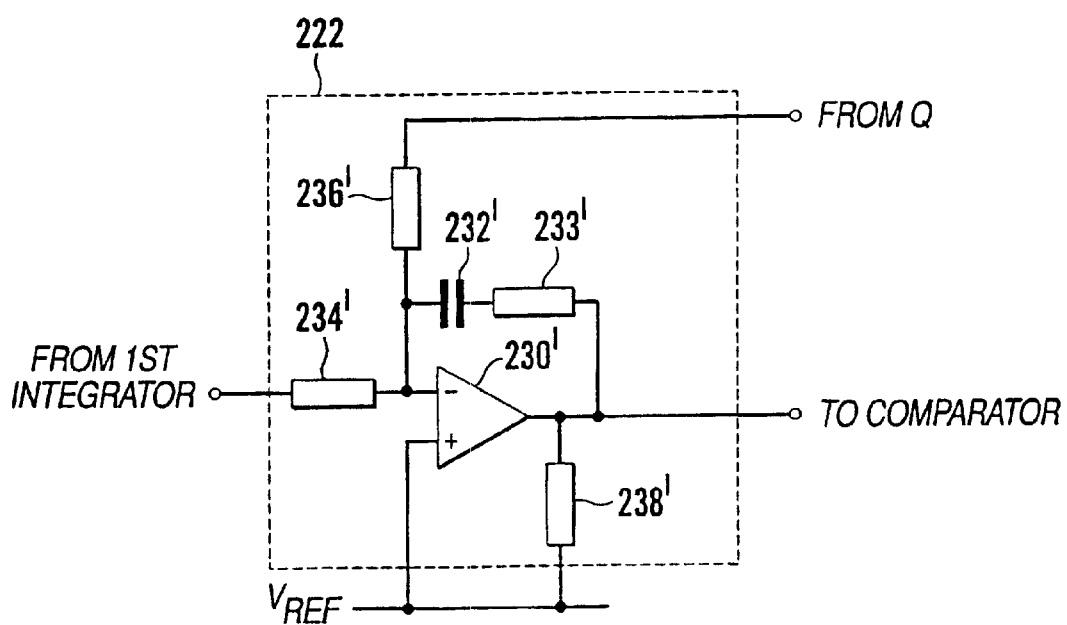
FIG. 14 is a circuit diagram of a second integrator of the Sigma-Delta modulator illustrated in FIG. 11.

The second integrator 222 is illustrated in FIG. 14 and, as far as it is identical to the first integrator its corresponding components are allocated the same reference numerals distinguished by a prime mark ('). In addition, in series with the integrating capacitor 232', a noise shaping resistor 233' is provided. This has the effect of shaping the noise spectrum of the sigma delta modulator to be substantially the inverse of the frequency response of the operational amplifiers 230, 230'. This is useful in reducing the noise on the output of the sigma delta modulator.

The analog circuits described above are particularly advantageous in that conversion from amplitude modulated AC signals to trains of digital pulses can be effected without the intermediate conversion of the analog signal into a baseband (DC) signal. In that way, there is no opportunity for DC offsets in the demodulated signal to affect the final measurement of volumetric flow.

A second order sigma-delta modulator is used in the modulation of the signal received from the electrode sense amplifier 82, in order to take advantage of enhanced noise shaping capabilities of such a device. A first order Sigma-Delta modulator in that case would probably generate some sampling tones, which might introduce errors into subsequent processing. However, a first order Sigma-Delta modulator is suitable for use in measuring the magnetic field, since in that case only long term drift of the magnetic field value is of importance; there is little likelihood of the amplitude of the magnetic field signal varying rapidly over time.

It is desirable that the hardware of the meter be symmetrical about a plane containing the axis of the pressure vessel 34 and perpendicular to the magnetic field applied by the pole pieces 60. For example, the magnetic pole pieces 60 should be aligned perpendicular to the axis of flow through the meter, to avoid unbalanced signals and magnetic pick-up. The manufacturing tolerances of the components of the meter, and especially of the fixing rings 36 and the electrode support members 38, should be set such that alignment is sufficiently accurate for the desired level of accuracy of the meter.

Figure 15:
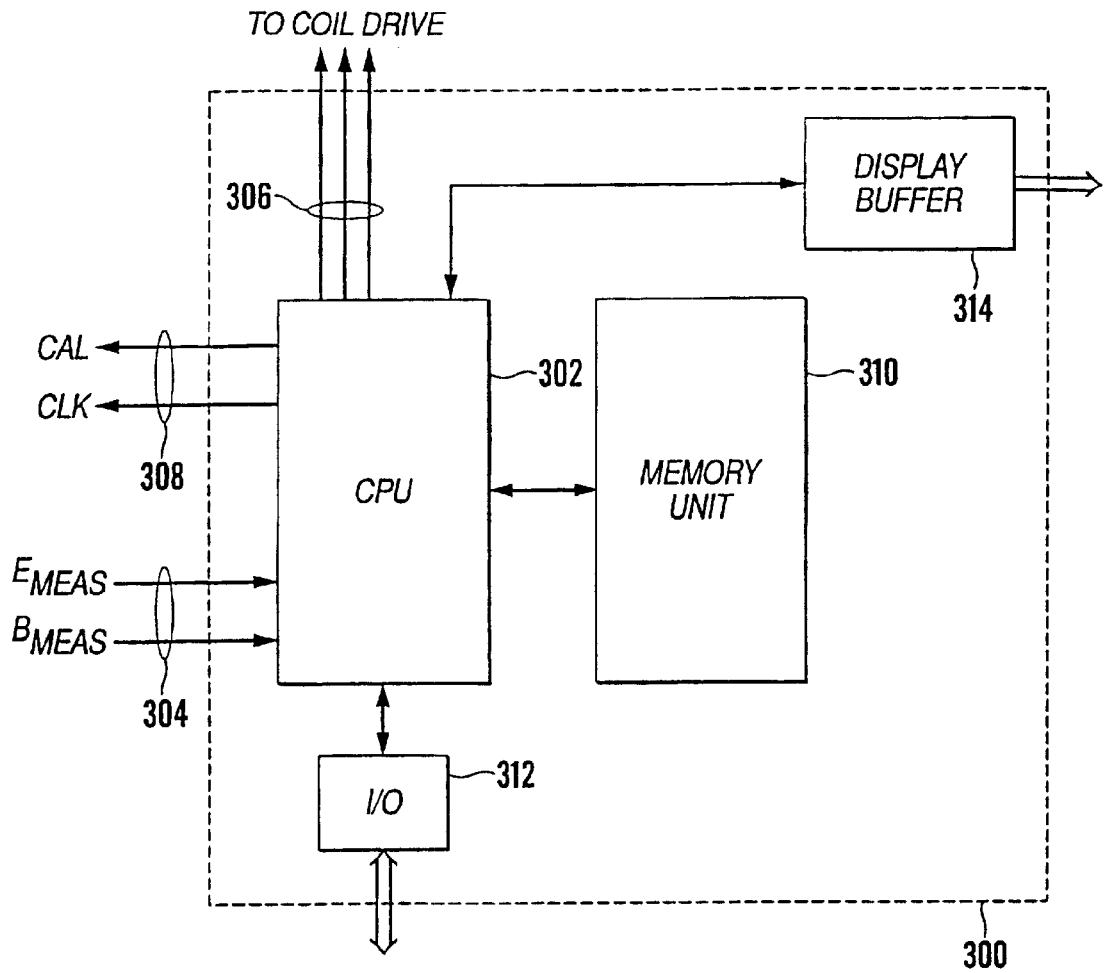
FIG. 15 is a circuit diagram of a microcontroller of the controller illustrated in FIG. 8.

With reference to the FIGS. 15 and 16 of the drawings, the microcontroller 300 will now be described in further detail. The microcontroller comprises a central processing unit (CPU) 302 which is capable of receiving input signals $E_{MEAS}$ and $B_{MEAS}$ from the analog sense amplifying unit 200 via input lines 304. The CPU 302 is further configured to produce three control signals on output lines 306 for controlling the coil drive 80, to be described later. Further outputs 308 are provided in order to present the CLK and CAL signals to other parts of the apparatus. The microcontroller 300 further comprises a memory unit 126 for the storage of processor implementable instructions and data and an I/O interface 312 by which the microcontroller 300 can be connected to the programmer 112 linked to the port 110. The microcontroller 300 further comprises a display buffer 314 for the storage of data to be displayed at the display 320.

The microcontroller 300 can be programmed by connecting a programmer 112 to the I/O interface 312 and by writing computer implementable instructions to the memory 310. In that way, the microcontroller 300 can be configured as the particular situation dictates.

An example will now be given of the manner in which the microcontroller can be configured in order to present data to the display 320 representative of the consumption of water passing through the magnetic flow meter 20.

Figure 16:
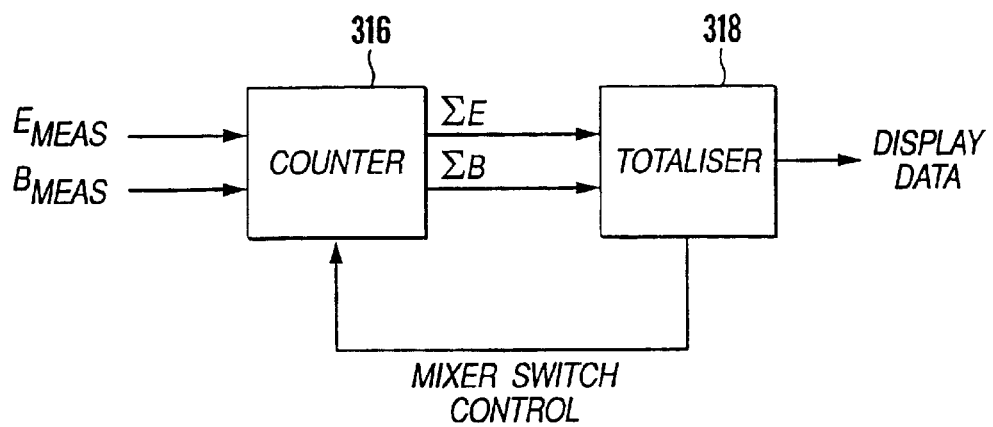
FIG. 16 is a schematic diagram showing the configuration of the microcontroller illustrated in FIG. 15.
Figure 17:
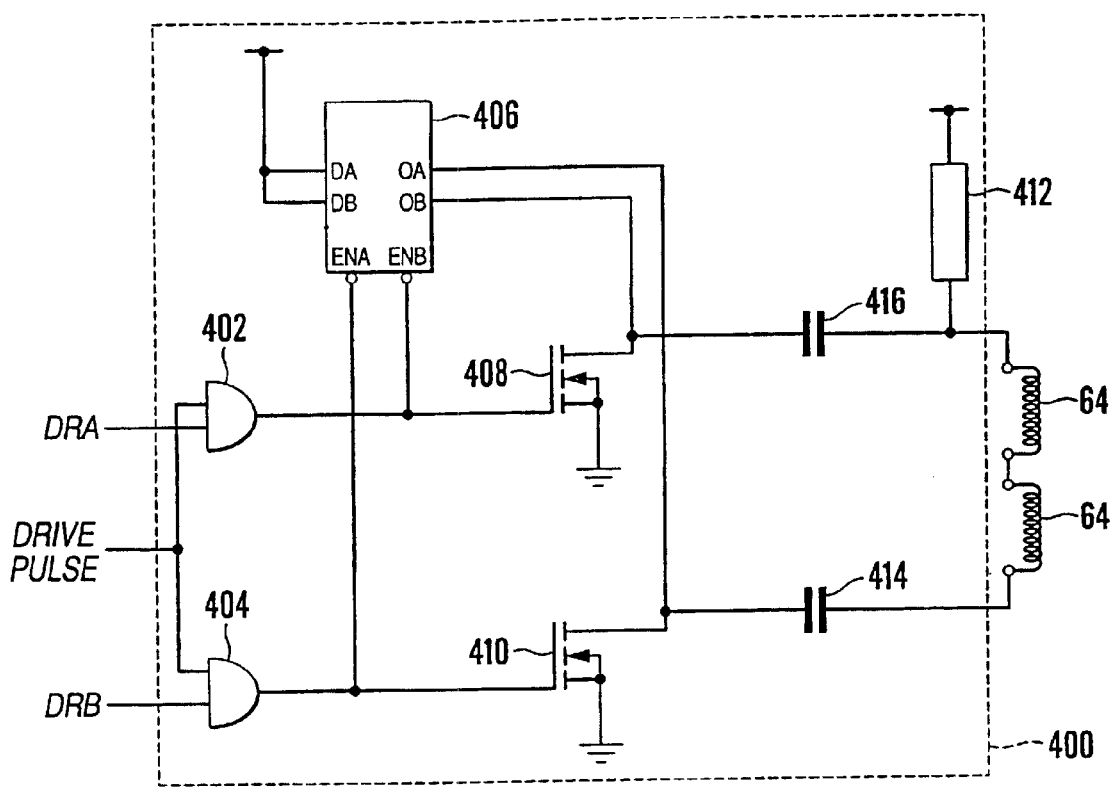

In FIG. 16, the microcontroller 300 includes a counter 316 which counts pulses input on the $E_{MEAS}$ and $B_{MEAS}$ signals, to produce integrated count signals based on those inputs. The signals are passed to a totaliser 318 which processes those count signals to produce display data to be stored in the display buffer 314. The totaliser 318 further produces a mixer switch control signal which is passed back to the counter 316. The mixer switch control signal controls the direction in which the counter 316 counts each of $E_{MEAS}$ and $B_{MEAS}$ pulses.

In FIG. 12E, the mixer switch control signal is shown as a digital signal which can take either "DOWN" or "UP" values. The mixer switch control signal is assigned the "DOWN" value when the input voltage in FIG. 13A is in the positive half of the cycle, and the "UP" value when the input voltage is in the negative half of the cycle. FIG. 12E illustrates the situation where fluid is flowing through the meter 20 in a predetermined forward direction. In that way, pulses are concentrated in the parts of the signal for which the mixer switch control signal is assigned the "UP" value. Therefore, the integrated counts for $E_{MEAS}$ and $B_{MEAS}$ will both gradually rise as the number of pulses in the "UP" sections of the signal exceeds the number of pulses in the "DOWN" sections of the signal. Towards the end of the signal, it can be seen that the flow falls to zero, and the concentration of the pulses reaches a steady state. In that case, the counter will count up the same number of pulses as it counts down.

If, over a whole number of cycles of the 8 Hz input signal, the integrated count ΣE relating to the $E_{MEAS}$ signals falls, it can be ascertained that the fluid being measured through the meter is flowing in the reverse direction. Rather than allowing this reversal of flow to result in a totalised value at the display 320 being allowed to fall, the reduction in the integrated count is stored in a buffer in the totaliser 318. The accumulation of this reverse flow value will gradually be taken into account as flow returns to the normal forward direction.

Of course, in a domestic supply, reverse flow would be very rare, and would only occur in certain situations, such as if flow has been interrupted after a period of consumption, allowing water to fall back through a supply pipe.

The totaliser 318 further processes the integrated count by scaling the count to a value for consumption, expressed in recognised units such as m$^3$ or litres, following which the final volumetric consumption value is stored in the display buffer 314. The volumetric consumption value can be stored in the display buffer 314 as the data becomes available, but it is convenient to only update the display 320 itself very slowly. This is because rapidly updating digital displays are very difficult to read. Accordingly, an update period of one second is suggested to be appropriate.

The scaling function may include some rounding of the previously derived values, and the remainders of those rounding functions are stored in a remainder buffer until they reach a level significant that they can be added to the volumetric consumption total.

The totaliser 318 may also include the facility to transmit messages as display data, such as messages indicating low flow or a reverse flow indicator.

The mixer switch control signal can be considered to be a demodulating control signal. This should be in phase with the received signal from the electrodes, so as to obtain an accurate count. If the phase of the received signal drifts, then the phase of the mixer switch control signal should be adjusted accordingly. Otherwise, errors may be incorporated into the integrated counts, in particular DC drift from stray magnetic field pick-up.

Configuration of the microcontroller 300 to perform functions as described above may be by means of processor implementable instructions, stored in the memory unit 310. Preferably, the memory unit 310 includes read only memory, and the processor implementable instructions can be programmed into that read only memory prior to operation of the meter 20.

Figure 18:
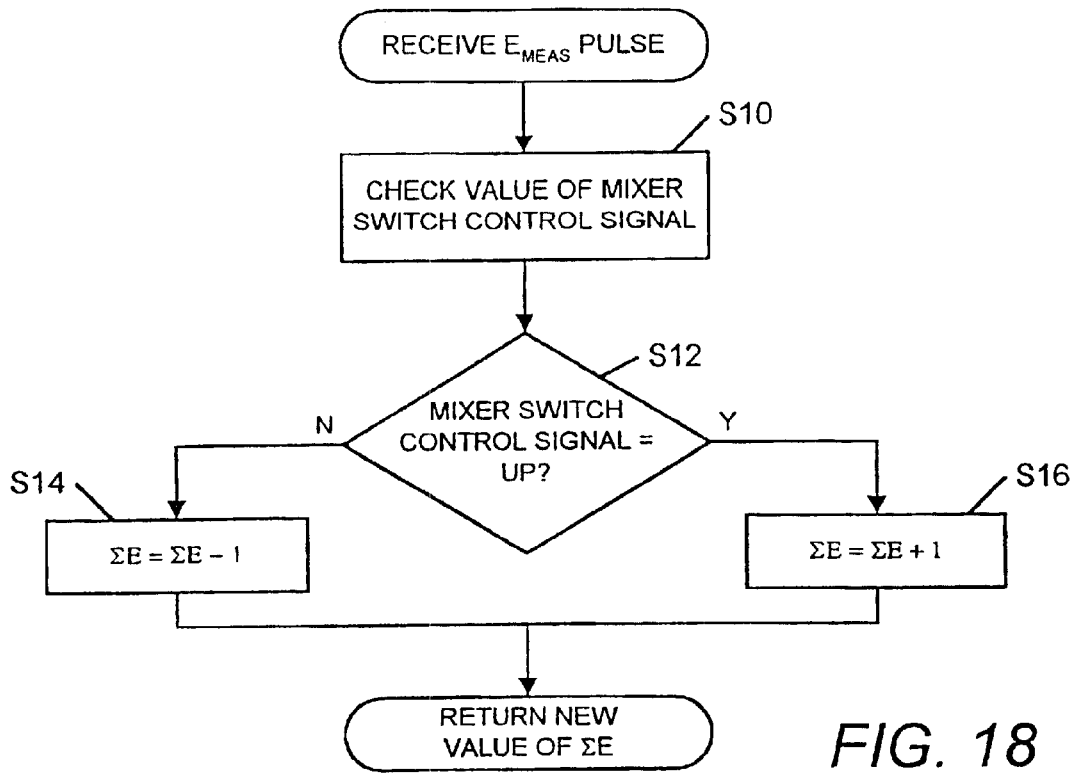
FIGS. 18 and 19 are flow diagrams illustrating routines for performance in the counter unit of the configuration shown in FIG. 16.
Figure 19:
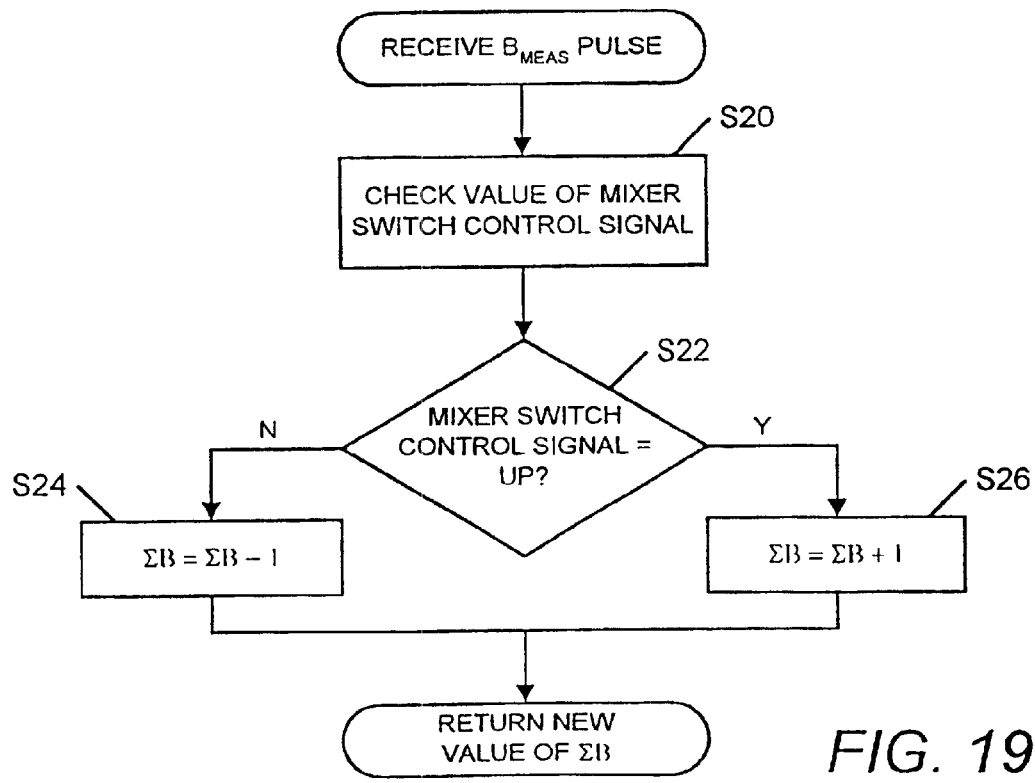
Figure 20:
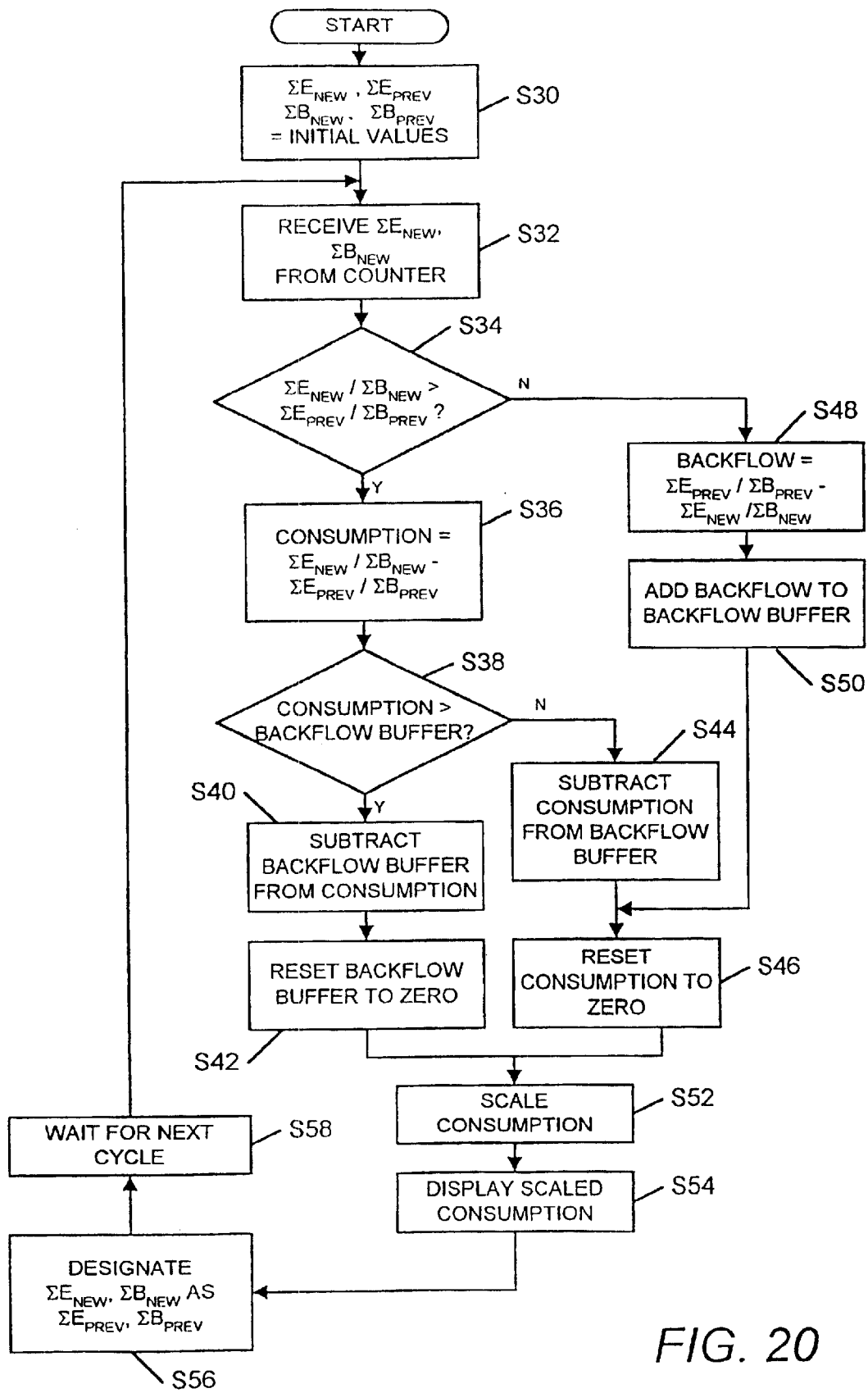
FIG. 20 is a flow diagram illustrating a routine for performance in the totaliser unit of the configuration shown in FIG. 16.

Processor implementable instructions are illustrated by way of example in FIGS. 18 to 20 attached hereto.

FIG. 18 illustrates a routine which can be performed by the counter 316 on receipt of a pulse input on the $E_{MEAS}$ signal. In step S10, the value of the mixer switch control signal received from the totaliser 318 is checked. Then, in step S12, an enquiry is made as to whether the mixer switch control signal is UP. If it is not UP (i.e. it is DOWN) then the routine passes to step S14 where a sum value ΣE is decreased by 1. Alternatively, if the mixer switch control signal is UP, then the routine passes to step S16, where the sum ΣE is increased by 1. After either step S14 or step S16, the new value of ΣE is returned to memory for use by other routines.

FIG. 19 illustrates a routine which can be performed by the counter 316 on receipt of a pulse input on the $E_{MEAS}$ signal. In step S20, the value of the mixer switch control signal received from the totaliser 318 is checked. Then, in step S22, an enquiry is made as to whether the mixer switch control signal is UP. If it is not UP (i.e. it is DOWN) then the routine passes to step S24 where a sum value ΣB is decreased by 1. Alternatively, if the mixer switch control signal is UP, then the routine passes to step S26, where the sum ΣB is increased by 1. After either step S24 or step S26, the new value of ΣB is returned to memory for use by other routines.

FIG. 20 illustrates a totaliser routine which starts the instant the microcontroller initialises on start-up. In step S30, which is an initialisation step, four variables, namely $\Sigma E_{NEW}$, $\Sigma E_{PREV}$, $\Sigma B_{NEW}$, $\Sigma E_{PREV}$, are set to initial values. Initial values for the $\Sigma E_{NEW}$ and $\Sigma E_{PREV}$ variables may be 0, but the initial values for $\Sigma B_{NEW}$ and $\Sigma B_{PREV}$ cannot be 0. This is because in later division calculations, $\Sigma B_{NEW}$ and $\Sigma B_{PREV}$ are used as the divisor. A suitable initial value for each of $\Sigma B_{NEW}$ and $\Sigma B_{PREV}$ could be 1.

In step S32, values of $\Sigma E_{NEW}$ and $\Sigma B_{NEW}$ are received from the counter 316. Then, in step S34, a test is made to ascertain whether the following condition holds:

$$\frac{\Sigma E_{NEW}}{\Sigma B_{NEW}} > \frac{\Sigma E_{PREV}}{\Sigma B_{PREV}} \qquad (4)$$

Each of the variables represents a value for the strength of the electric field (E) and the magnetic field (B) as the case may be, at a particular sampling time. Therefore, by dividing values of the E field by values of the B field, it is possible to obtain a value representative of volumetric flow through the meter. Step S34 ascertains whether volumetric flow has increased or decreased through the meter since the last test. If the inequality holds, then the routine passes to step S36.

In step S36, a consumption value is defined which represents the difference between the value representative of volumetric flow at the present time and volumetric flow previously, that difference being representative of the amount of liquid which has flowed through the meter since the last test.

In step S38, the consumption value is tested against a value contained in a back flow buffer. The back flow buffer contains a value representative of a volume of liquid which might have flowed back through the meter, and must be accounted for in later totals. If consumption is greater than the value in the back flow buffer then the routine passes to step S40, wherein the value in the back flow buffer is subtracted from the consumption value, and in step S42 the back flow buffer is set back to zero.

If, in step S38, the consumption value is not greater than the value held in the back flow buffer, then the consumption value measured at this time is not great enough to clear the back flow buffer. In that case, in step S44, the consumption value is subtracted from the back flow buffer, so as to clear as much of the contents of the back flow buffer as is possible at this time. In step S46, the consumption value is set to zero.

Referring back to step S34, if the inequality does not hold, then it can be concluded that fluid has passed in the reverse direction through the meter. This is known as back flow as previously noted. A back flow value is calculated in step S48, being the difference between the ratio of E field to B field values as previously described but taking account of the fact that the previous ratio will be larger than the new ratio. Thereafter, the back flow value is added to the contents of the back flow buffer in step S50. Following step S50, the routine resumes, with step S46 resetting consumption to zero (in case it had in some way not been at zero).

Following either step S42 or step S46, step S52 scales the consumption value (which after step S46 will be zero), to produce a value for volumetric consumption in recognised units, such as cubic metres or litres. Thereafter, that scale consumption value is displayed in step S54. Display may take place on only a sample of possible consumption values, so as to retain a value on the display for a sufficiently long period (such as one second) that the display can be read easily.

Following step S54, the received summation values $\Sigma E_{NEW}$ and $\Sigma B_{NEW}$ are moved into variables $\Sigma E_{PREV}$ and $\Sigma B_{PREV}$ in step S56, in preparation for receipt of new values of $\Sigma E_{NEW}$ and $\Sigma B_{NEW}$. Thereafter, in step S58, the routine waits for the next cycle. That wait step is advantageous in that it prevents excessive power consumption by the totaliser 318, thereby limiting demand on the power supply. This allows the power supply to be in the form of a battery which can have a long lifetime. This allows use of the present meter as a domestic water meter, which requires very little maintenance.

Following the wait step S58, the routine resumes with the receipt of new values of $\Sigma E_{NEW}$ and $\Sigma B_{NEW}$ from the counter, in step S32.

The coil drive 400 will now be described in further detail with reference to FIG. 17. As mentioned previously, the CPU is capable of producing drive signals for the coil drive on 3 lines. However, in the present implementation, the CPU only has the facility to produce a single output with accurately timed edges. In order to drive the two coils 64 illustrated, it is necessary to have two signals with accurately timed edges. Therefore, the circuit of FIG. 17 has been devised which only requires one accurately timed signal to be provided, along with two less accurate switching pulses.

The coil drive 400 receives 3 signals from the CPU. The first and second signals DRA and DRB are 8 Hz square waves with generally poorly timed edges. The signals are inverses of each other. If these signals were alone to be used to drive the coil, the result would be an extremely jittery coil signal. This is undesirable, since it would result in extremely noisy and inaccurate meter responses. Instead, a third signal, hereinafter referred to as DRIVE PULSE, is also provided. DRIVE PULSE is an accurately timed 16 Hz square wave which can be used to time the coil drive 400.

Figure 17:
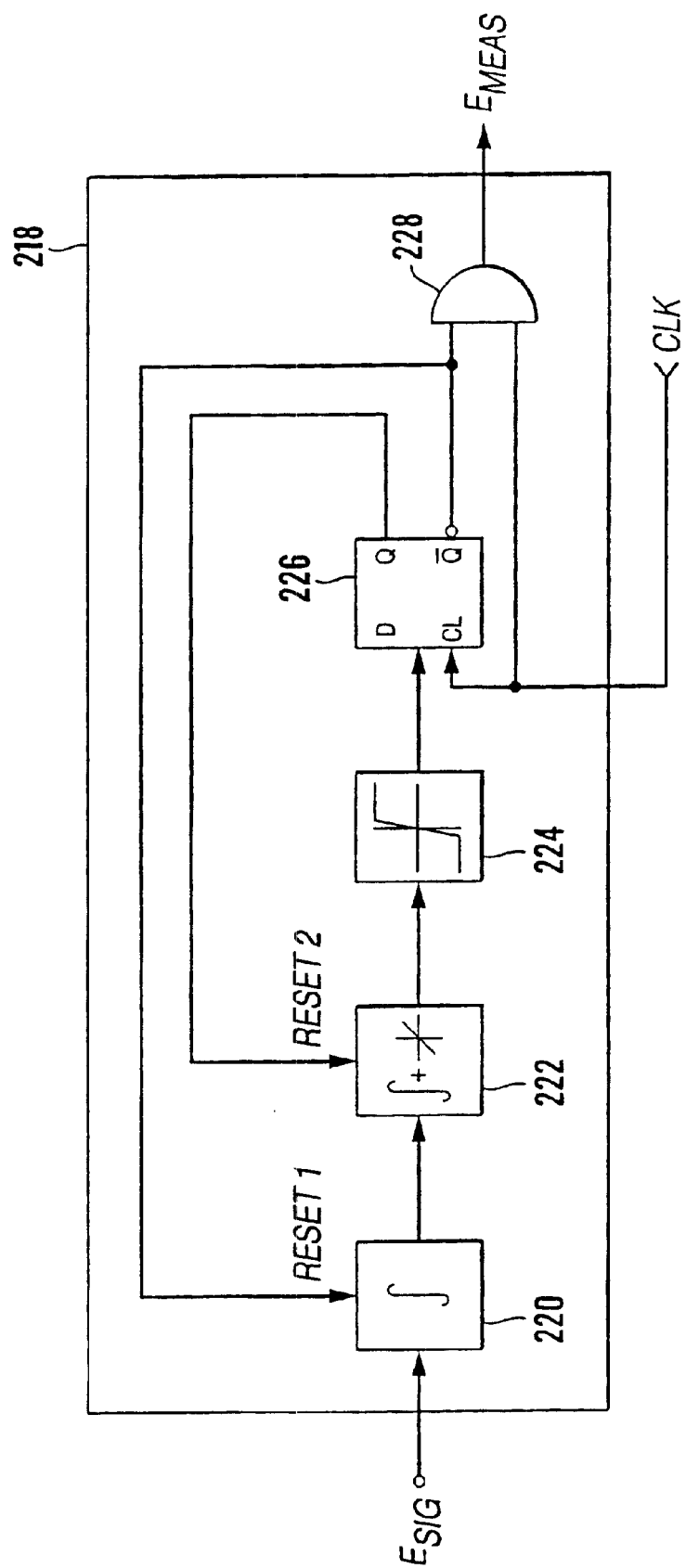
FIG. 17 is a schematic diagram of a coil drive of the controller, illustrated in FIG. 8, shown in conjunction with coils of the magnetic flow meter illustrated in FIG. 1.

The coil drive 400, as illustrated in FIG. 17, is provided with two AND gates 402, 404, by which signals DRA, DRB are respectively gated by the DRIVE PULSE SIGNAL. In that way, DRA and DRB may be given accurately timed edges. The accurately timed gated DRA, DRB signals are input to enable inputs ENA, ENB of a dual tristate gate 406. The dual tristate gate 406 has two inputs DA, DB, which are passed to corresponding outputs OA, OB if the corresponding enable input ENA, ENB is logically LOW. Otherwise, the output is tristate (open circuit).

Practically, a gate device is provided for the tristate gate 406 which has four DA inputs, four DB inputs and four of each of the corresponding outputs OA, OB. In that arrangement, the Boolean sum of the four inputs is passed to each of the four corresponding outputs if the respective enable input is low. The present embodiment makes use of that device by tying together the groups of four inputs and the groups of four output, specifically to obtain outputs with advantageously low impedance.

The inputs DA, DB are all tied to supply voltage. Therefore, depending on the enable inputs, the outputs can either be logically high or tristate.

The gated DRA and DRB signals are also connected to gates of respective field effect transistors 408, 410. The drains of the field effect transistors 408, 410 are connected to outputs of respective tristate gates 406. The sources of the field effect transistors are held to ground.

An inductive capacitive network is connected between the drains of the field effect transistors 408, 410. The inductive capacitive network comprises the drive coils 64 connected in series, on one side of which is the resonating capacitor 104. A resistor 412 is connected between the resonating capacitor 104 and the drive coils 64, and to supply voltage. A capacitor 414 on the other side of the coils 64 provides AC coupling.

By this arrangement, the drive coils 64 can be caused to resonate by the provision of accurately timed gated DRA and DRB signals, which repeatedly switch on the field effect transistors 408, 410 to pull the connections to the inductive capacitive network to ground, following which the field effect transistors 408, 410 are switched off and the tristate gates 406 switched on. When the tristate gates 406 are switched on, the connections to the inductive capacitive network are sent to supply voltage. This is conducted at 8 Hz, and the oscillation causes sufficient energy to be stored in the network to generate a semi-resonant oscillation. Once the gated DRA and DRB signals are removed, the field effect transistors 156, 158 are switched permanently on and the gates 154 are rendered tristate. In that case, the only significant loss in the system is internal to the reactive components 64 and any resistance of the field effect transistors 408, 410. In fact, the circuit can be designed to be sufficiently efficient that firing pulses need only be sent to the coil drive 80 periodically. The need to send coil drive signals DRA, DRB and DRIVE PULSE, can be determined by monitoring the magnitude of the $B_{MEAS}$ signal received from the analog sense amplifying unit 200.

It will be appreciated that the natural resonant frequency of the network may be other than 8 Hz. However, the present embodiment accommodates variations from the resonant frequency, by means of the circuit having a Q factor of at least 10.

The invention is not limited to the embodiments illustrated in the drawings and described above. For example, it would be possible to shape the flow path if it was found that other shapes were advantageous or provided further structural strength. Moreover, a rectangular flow tube including selectively large pole pieces to define a uniform magnetic field across the flow path could be designed, as long as the construction was capable of withstanding the recognised stresses without excessive strain.

The invention has application in the field of commercial water metering, such as for domestic properties. A single 3 volt battery can be provided to power the meter, which can have a total power requirement of less than 0.30 mW. An advantage of using digital components to drive the coils 64 in such circumstances is that analog switches would have distorted outputs at reduced supply voltages near the end of the battery life. Also, software demodulation allows sensing circuitry to be provided without a need for analog switches. Despite the fact that the meter has very low power consumption (about 40,000 times less than typical meters presently on the market) it provides a means of measuring volumetric flow with comparable measuring performance.

Figure 21:
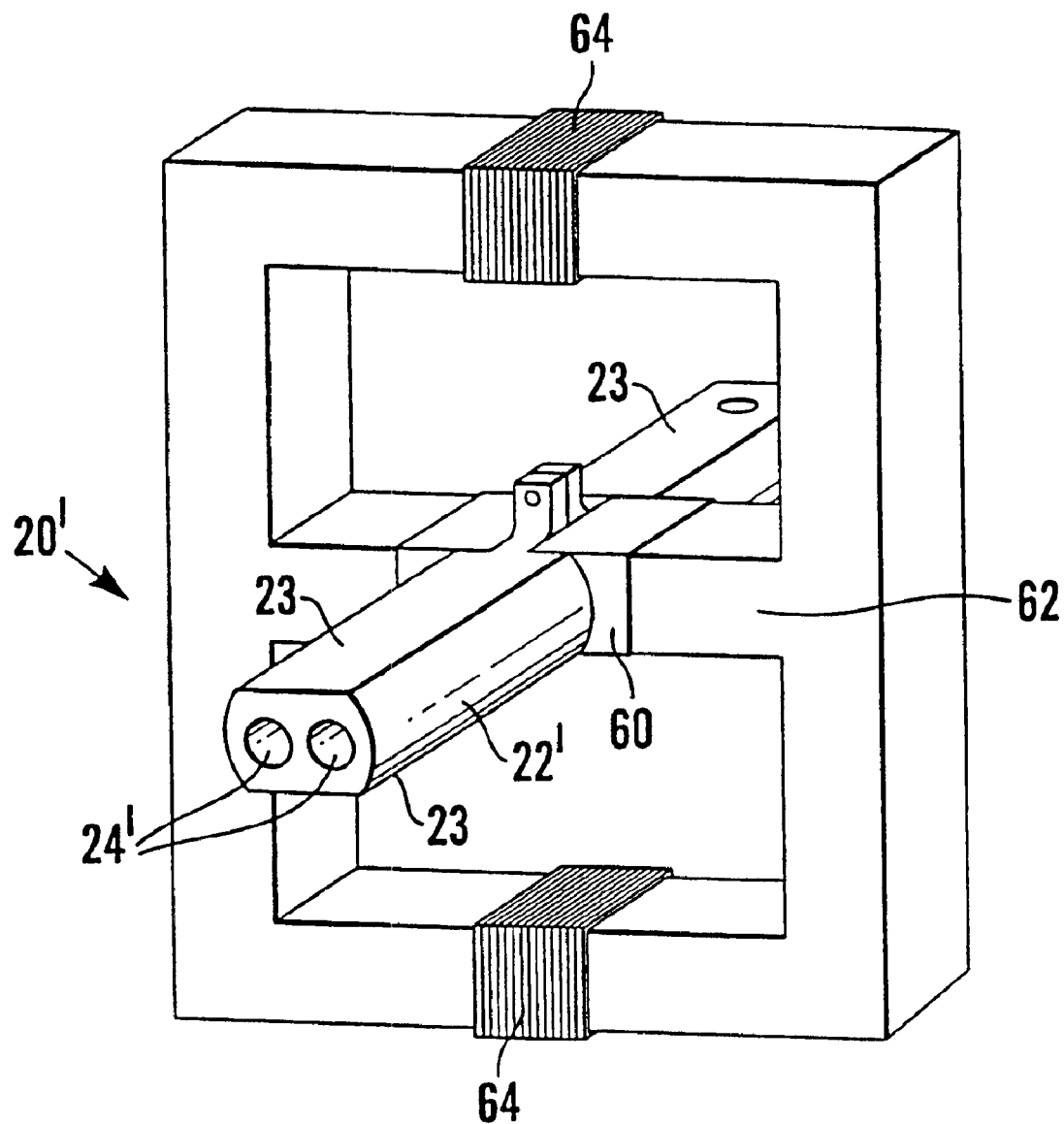
FIG. 21 is a perspective view of a magnetic flow meter in accordance with a second specific embodiment of the present invention.
Figure 22:
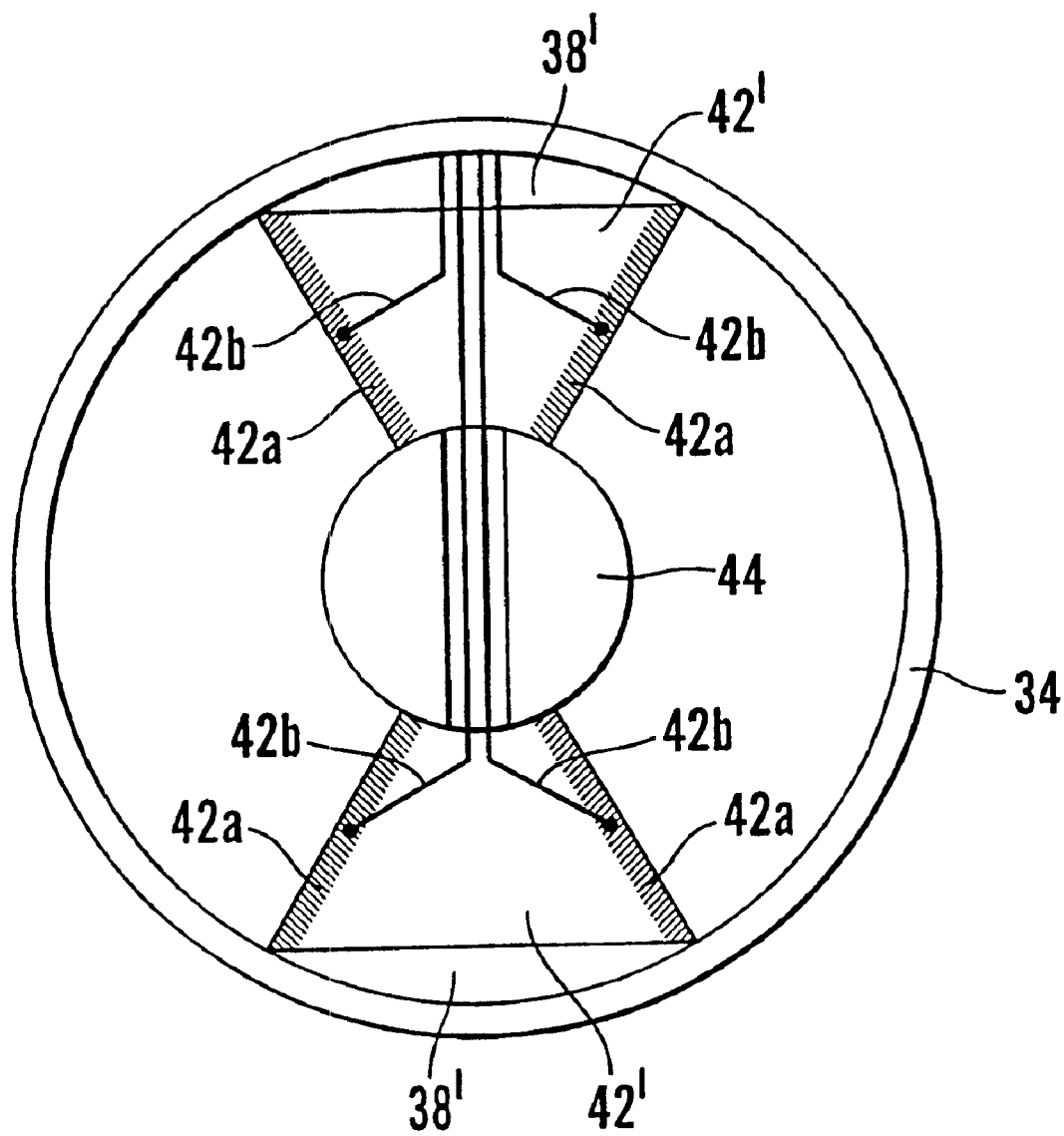
FIG. 22 is a schematic cross section of the magnetic flow meter illustrated in FIG. 21.

As an alternative to the magnetic flow meter in accordance with the first specific embodiment of the invention, a second embodiment is illustrated in FIGS. 21 and 22. This magnetic flow meter is a differential meter, providing the facility for measuring flow through two different flow channels, either measuring the absolute value of both flows or the difference between the two flows. In this case, the flow meter 20' is provided with many components which are identical to those provided in the first flow meter 20. The components illustrated in FIG. 21 which are identical to those illustrated in FIG. 1 are given the same reference numerals.

Moreover, the flow meter 20' has body portions 22' which are modified, in that they have two parallel through bores 24'. Each through bore 24' is in fluid communication with one side of the electrode/magnetic core assembly within the pressure vessel 34. In order to keep the two flow channels separate, the support members 38' are slightly modified from those provided in the first embodiment, in that they include extended portions so as to define a fluid divider, which abuts the body portions 22' suitably to maintain separation of the flow paths.

As illustrated in FIG. 22, the pressure vessel 34 is of the same construction as that in the first embodiment.

The arrangement of electrodes 42' and a magnetic core 44 is the same as in the first embodiment. However, the construction of the electrodes is somewhat different. In this case, the electrodes 42' are of electrically insulating material. The surfaces of the electrodes 42' which are in contact with fluid flowing through the meter in use have a surface coating 42A applied thereto. The surface coating 42A is electrically conductive. Electrical connections 42B are made from each of the surface coatings 42A; those electrical connections are guided out of the pressure vessel 34 in the same manner as in the first embodiment.

Figure 9:
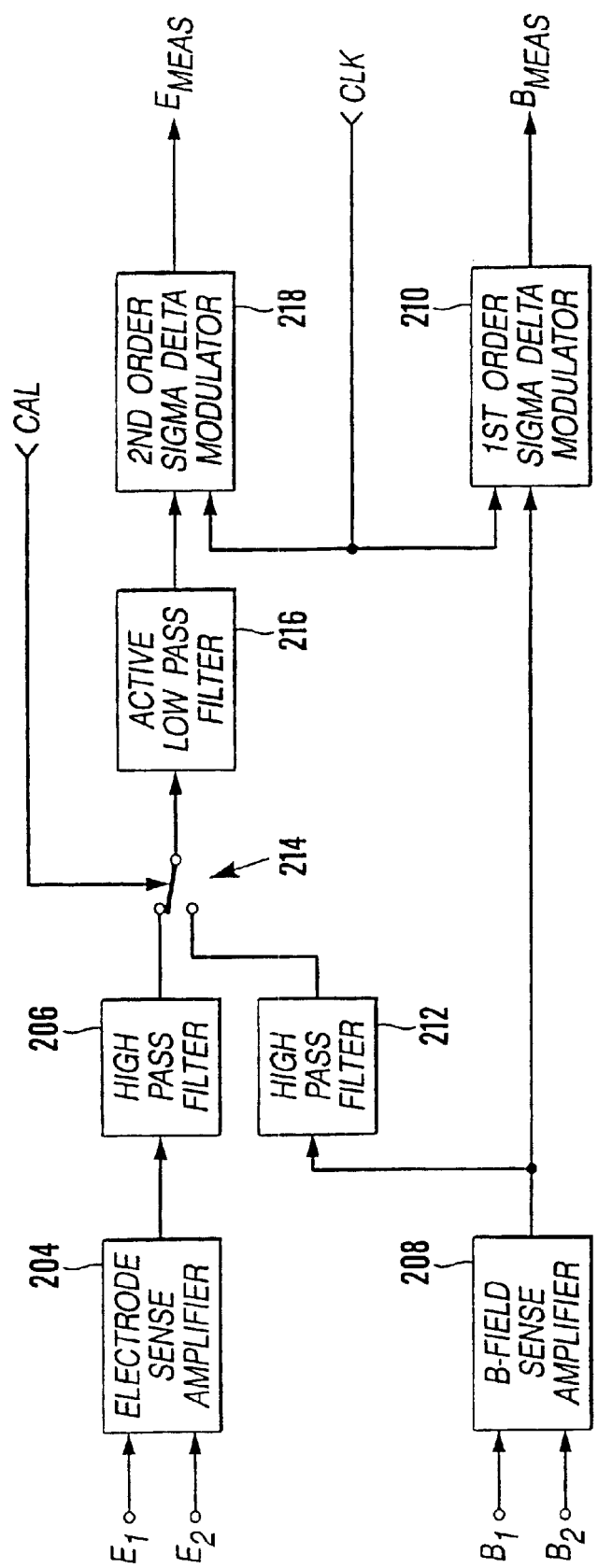
FIG. 9 is a schematic circuit diagram of an analogue sense amplifying unit of the controller illustrated in FIG. 8.

The differential flow meter 20' so described provides the facility for measurement of two flow rates. Measurement can be effected by short circuiting the two faces of the lower electrode, and measuring the potential difference between the two faces of the upper electrode. This can be carried out using the controller circuit illustrated in FIG. 8, connecting the two faces of the upper electrode to points E1 and E2 in FIG. 9. Alternatively, two analog sense amplifier units 200 could be provided, each monitoring potential difference developed between the face of the upper electrode and a corresponding face of the lower electrode, the signals produced by those units 200 being processed by a microcontroller adapted to receive signals from two analog sense amplifier units simultaneously.

Figure 23:
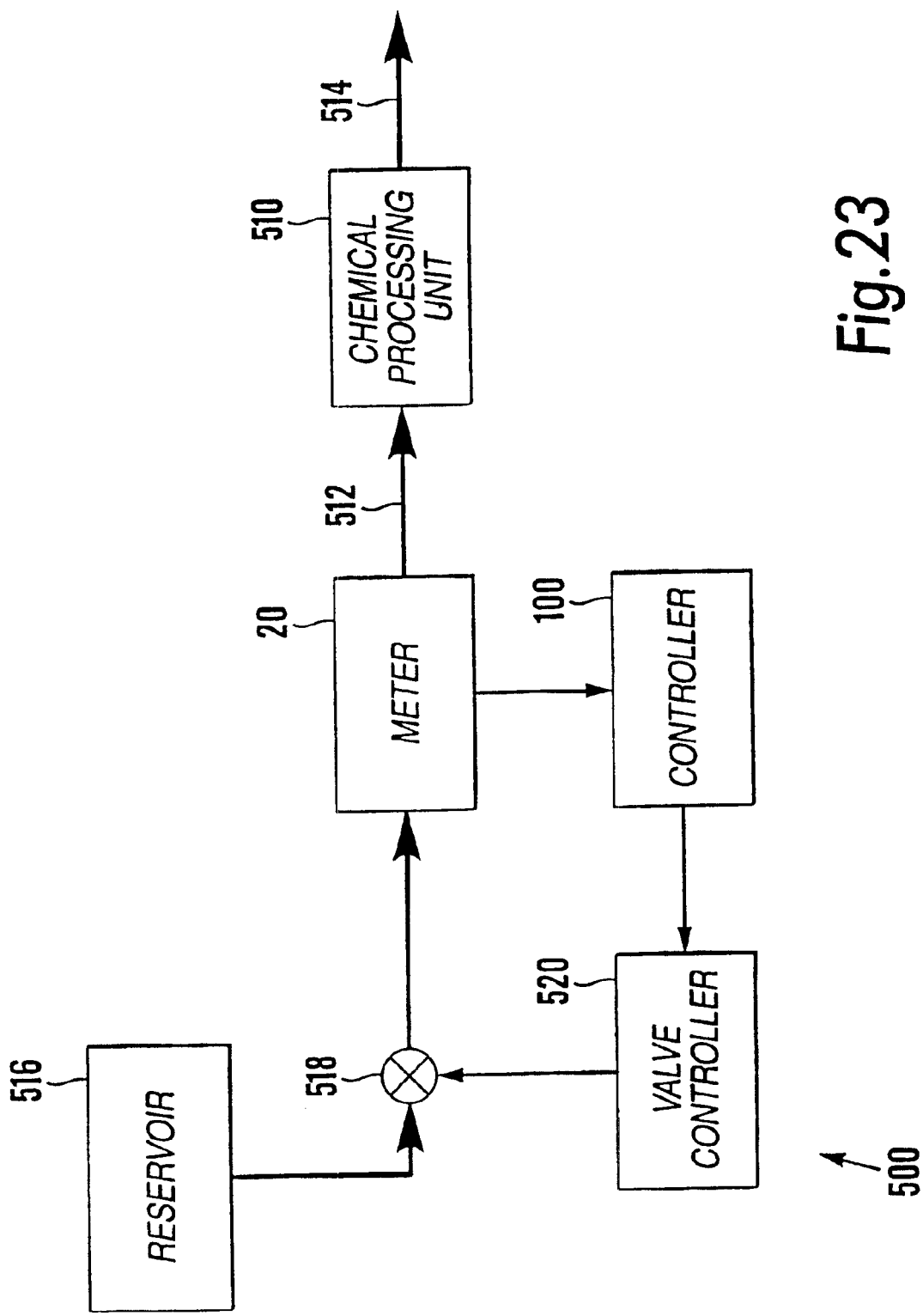
FIG. 23 is a process diagram of an industrial application of the meter illustrated in FIG. 1.

FIG. 23 illustrates a further application of the meter 20 of the first embodiment. The meter 20 is installed in a chemical processing plant 500 comprising a chemical processing unit 510. The chemical processing unit 510 has an inlet 512 for a fluid which is processed by the chemical processing unit to generate a product at an outlet 514.

A supply of the fluid to be processed is stored in a reservoir 516, and the meter 20 is installed in the path between the reservoir 516 and the inlet 512 in order to monitor delivery of the fluid to the chemical processing unit 510.

A valve 518 is provided upstream of the meter, controlled by a valve controller 520. The valve controller is operable in response to display data generated by the controller 100 as illustrated in FIG. 8. In order to facilitate monitoring of the display data by the valve controller 520, the controller 100 may be provided with a facility for producing a voltage output, or a current output (4 to 20 milliamps) representative of the display value. The valve controller 520 is configured to operate the valve 518 in response to display data, so as to control delivery of fluid to the inlet 512 of the chemical processing unit 510. In that way, automatic delivery of fluid to a chemical processor unit 510 can be effected, leading to convenient operation of a chemical process.

In the implementation shown in FIG. 23, the meter 20 and the controller 100 can be installed such that a mains power supply is available. Therefore, some of the features of the controller 100 which are provided for limiting power consumption may not be essential in the implementation. For instance, it may not be necessary to resonate the coils of the meter. Moreover, more powerful computation means might be provided in the controller 100, to facilitate better analysis of data. This could provide more convenient data presentation for the valve controller 520, leading to more accurate control of fluid delivery.

What is claimed is:

1. A magnetic flow meter comprising:
   a conduit operable to guide a flow along a flow path;
   a magnetic field generator operable to generate an alternating magnetic field at a drive frequency across the flow path;
   a flow sensor operable to sense electromagnetic fields generated across the flow path and to output a corresponding flow sensor signal including: (a) an electric field component at the drive frequency and at a first phase, which electric field component varies with an electric field generated by the interaction of the magnetic field generated by said magnetic field generator and said flow; and (b) an interfering component at the drive frequency and at a second different phase;
   a magnetic field sensor operable to sense the magnetic field generated by said magnetic field generator and to output a corresponding magnetic field sensor signal at said drive frequency at a phase related to said second phase;
   a calibration processor operable to process said magnetic field sensor signal to generate an alternating calibration control signal at said drive frequency whose phase depends upon the phase of said magnetic field sensor signal;
   a first processing circuit responsive to the calibration control signal and operable to process the flow sensor signal to determine a measure of the strength of the electric field component thereof;
   a second processing circuit operable to process the magnetic field sensor signal to determine a measure of the strength of the magnetic field sensor signal; and
   a measurement processor operable to determine a measure of the flow in said conduit in dependence upon the determined measure of strength of said electric field component and the determined measure of strength of said magnetic field sensor signal.

2. A magnetic flow meter according to claim 1, wherein said conduit includes a flow separator for separating the flow along the conduit into first and second flow paths.

3. A magnetic flow meter according to claim 2, wherein said magnetic field generator is operable to generate said magnetic field across both said first and second flow paths and wherein said flow sensor is operable to sense electromagnetic fields generated across at least one of said flow paths.

4. A magnetic flow meter according to claim 2, wherein said separator is a magnetically active element and is arranged to condition the magnetic field generated by said magnetic field generator to act substantially orthogonally to the direction of flow through the flow paths.

5. A magnetic flow meter according to claim 2, wherein said flow sensor is operable to sense electromagnetic fields generated across both flow paths and to output a common flow sensor signal.

6. A magnetic flow meter according to claim 2, comprising first and second flow sensors each operable to sense electromagnetic fields generated across a respective one of the first and second flow paths.

7. A magnetic flow meter according to claim 1, wherein said conduit comprises an elongate vessel defining the flow path, wherein the magnetic field generator comprises a magnetically permeable core positioned internally longitudinally of the vessel and magnetically permeable poles external to the vessel.

8. A magnetic flow meter according to claim 7, wherein the flow sensor comprises first and second electrodes that are substantially magnetically impermeable and arranged on substantially diametrically opposed sides of the core, interposed between the core and an internal surface of the vessel, with two flow paths being defined in the vessel which are separated by the first and second electrodes and the core in combination.

9. A magnetic flow meter according to claim 8, wherein the elongate vessel is substantially cylindrical, and wherein the core is substantially cylindrical and is aligned substantially axially of the vessel.

10. A magnetic flow meter according to claim 1, wherein said magnetic field generator comprises a coil and a drive circuit for applying an alternating drive signal to the coil.

11. A magnetic flow meter according to claim 10, wherein said drive circuit and coil are resonant.

12. A magnetic flow meter according to claim 11, further comprising an energy source operable to supply energy intermittently to said resonant drive circuit and coil.

13. A magnetic flow meter according to claim 1, wherein said magnetic field sensor comprises a sensor coil.

14. A magnetic flow meter according to claim 1, wherein said first processing circuit comprises a circuit operable to receive the flow sensor signal and for generating therefrom a series of pulses whose frequency depends upon the measure of strength of the electric field component of the flow sensor signal.

15. A magnetic flow meter according to claim 14, wherein said first processing circuit includes a counter for counting the pulses within said series of pulses.

16. A magnetic flow meter according to claim 15, wherein said first processing circuit comprises an up/down control circuit operable to cause said counter to increment the count with each pulse in the series or to decrement the count with each pulse in-the series, and wherein said up/down control circuit is responsive to said calibration control signal.

17. A magnetic flow meter according to claim 16, wherein said up/down control circuit is operable to cause said counter to increment the count during a first half-cycle of said calibration control signal and is operable to cause said counter to decrement the count during a second half-cycle of said calibration control signal.

18. A magnetic flow meter according to claim 1, wherein said second processing circuit comprises a circuit operable to receive the magnetic field sensor signal and for generating therefrom a series of pulses whose frequency depends upon the measure of strength of the magnetic field sensor signal.

19. A magnetic flow meter according to claim 18, wherein said second processing circuit includes a counter for counting the pulses within the series of pulses generated from said series of pulses.

20. A magnetic flow meter according to claim 19, wherein said second processing circuit comprises an up/down control circuit operable to cause said counter to increment the count with each pulse in said series or to decrement the count with each pulse in said series, and wherein said up/down control circuit is responsive to said calibration control signal.

21. A magnetic flow meter according to claim 20, wherein said up/down control circuit is operable to cause said counter to increment the count during a first half-cycle of said calibration control signal and is operable to cause said counter to decrement the count during a second half-cycle of said calibration control signal.

22. A magnetic flow meter according to claim 1, wherein said measurement processor is operable to calculate a ratio of said measure of strength of said electric field component and the measure of strength of the magnetic field sensor signal and is operable to determine said measure of the flow using the calculated ratio.

23. A magnetic flow meter according to claim 8, further comprising a first elongate electrode support including an elongated portion positioned adjacent the inner surface of the flow tube and at least one flow divider extending inward toward the core, the first electrode support having at least one rail, said rail being circumferentially aligned with the first electrode; and a second electrode support including an elongated portion positioned adjacent the inner surface of the flow tube and at least one flow divider extending inward toward the core, said second electrode support having at least one rail, said rail being circumferentially aligned with the second electrode.

24. A magnetic flow meter according to claim 23, wherein the at least one rail of the first electrode support comprises first and second flow dividers axially spaced from each other, the first electrode being positioned between the first and second flow dividers; and the at least one rail of the second electrode support comprises third and fourth flow dividers axially spaced apart from each other, the second electrode being positioned between the third and fourth flow dividers.

25. A magnetic flow meter according to claim 23, wherein the core includes a through-bore extending from a side of the core adjacent a radially inner side of the first electrode to a side of the core adjacent a radially inner side of the second electrode, wherein the first electrode includes a through-bore and further comprising an electrode lead which passes through the through-bore of the core and the through-bore of the first electrode and which is connected to the second electrode for connecting the second electrode to the first processing circuit.

26. A magnetic flow meter according to claim 25, wherein the first electrode support includes an axially extending electrode passage, and wherein the electrode lead for the second electrode extends within said electrode passage to an exterior of the conduit together with an electrode lead for connecting the first electrode to the first processing circuit.

27. A magnetic flow meter according to claim 23, wherein at least a portion of the at least one flow divider of the first electrode support contacts the core and at least a portion of the at least one flow divider of the second electrode support contacts the core, thereby holding the core in position.

28. A magnetic flow meter according to claim 8, wherein said first and second electrodes are formed from a graphite material.

29. A magnetic flow meter according to claim 1, having a periodic measurement cycle, wherein said first and second processing circuits are operable to process the respective signals continuously during each measurement cycle and to accumulate the respective sensor signal strengths in the measurement cycle and wherein said measurement processor is operable to determine a measure of the flow along said flow path at the end of each measurement cycle using the strength measures accumulated during that cycle.

30. A domestic water meter comprising:

a conduit operable to guide water along a flow path;

a magnetic field generator operable to generate an alternating magnetic field at a drive frequency across the flow path;

a flow sensor operable to sense electromagnetic fields generated across the flow path and to output a corresponding flow sensor signal including: (a) an electric field component at the drive frequency and at a first phase, which electric field component varies with an electric field generated by the interaction of the magnetic field generated by said magnetic field generator and the water flowing along said flow path; and (b) an interfering component at the drive frequency and at a second different phase;

a magnetic field sensor operable to sense the magnetic field generated by said magnetic field generator and to output a corresponding magnetic field sensor signal at said drive frequency at a phase related to said second phase;

a calibration processor operable to process said magnetic field sensor signal to generate an alternating calibration control signal at said drive frequency whose phase depends upon the phase of said magnetic field sensor signal;

a first processing circuit responsive to the calibration control signal and operable to process the flow sensor-:signal to determine a measure of the strength of the electric field component thereof;

a second processing circuit operable to process the magnetic field sensor signal to determine a measure of the strength of the magnetic field sensor signal; and a measurement processor operable to determine a measure of the flow of water in said conduit in dependence upon the determined measure of strength of said electric field component and the determined measure of strength of said magnetic field sensor signal.

31. A process flow control meter comprising:

a conduit operable to guide a flow along a flow path;

a magnetic field generator operable to generate an alternating magnetic field at a drive frequency across the flow path;

a flow sensor operable to sense electromagnetic fields generated across the flow path and to output a corresponding flow sensor signal including: (a) an electric field component at the drive frequency and at a first phase, which electric field component varies with an electric field generated by the interaction of the magnetic field generated by said magnetic field generator and said flow; and (b) an interfering component at the drive frequency and at a second different phase;

a magnetic field sensor operable to sense the magnetic field generated by said magnetic field generator and to output a corresponding magnetic field sensor signal at said drive frequency at a phase related to said second phase;

a calibration processor operable to process said magnetic field sensor signal to generate an alternating calibration control signal at said drive frequency whose phase depends upon the phase of said magnetic field sensor signal;

a first processing circuit responsive to the calibration control signal and operable to process the flow sensor signal to determine a measure of the strength of the electric field component thereof;

a second processing circuit operable to process the magnetic field sensor signal to determine a measure of the strength of the magnetic field sensor signal; and a measurement processor-operable to-determine a measure of the flow in said conduit in dependence upon the determined measure of strength of said electric field component and the determined measure of strength of said magnetic field sensor signal.

32. A method of measuring a flow rate of a fluid comprising:

providing a conduit operable to guide the fluid along a flow path;

generating an alternating magnetic field at a drive frequency across the flow path;

a first sensing step of sensing electromagnetic fields generated across the flow path and outputting a corresponding flow sensor signal including: (a) an electric field component at the drive frequency and at a first phase, which electric field component varies with an electric field generated by the interaction of the generated magnetic field and said flow; and (b) an interfering component at the drive frequency and at a second different phase;

a second sensing step of sensing the magnetic field generated in said magnetic field generating step and outputting a corresponding magnetic field sensor signal at said drive frequency at a phase related to said second phase;

using a calibration processor to process said magnetic field sensor signal to generate an alternating calibration control signal at said drive frequency whose phase depends upon the phase of said magnetic field sensor signal;

using a first processing circuit responsive to the calibration control signal, to process the flow sensor signal to determine a measure of the strength of the electric field component thereof;

using a second processing circuit to process the magnetic field sensor signal to determine a measure of the strength of the magnetic field sensor signal; and determining a measure of the flow in said conduit in dependence upon the determined measure of strength of said electric field component and the determined measure of strength of said magnetic field sensor signal.

33. A magnetic flow meter comprising:

a conduit operable to guide a flow along a flow path;

a magnetic field generator operable to generate a magnetic field across the flow path;

an electric field sensor operable to sense an electric field generated across the flow path by the interaction of the magnetic field generated by said magnetic field generator and the flow in said flow path and to output a corresponding electric field sensor signal;

a magnetic field sensor operable to sense the magnetic field generated by said magnetic field generator and to output a corresponding magnetic field sensor signal;

a first processing circuit operable to process the electric field sensor signal to determine a measure of the strength of the electric field sensor signal;

a second processing circuit operable to process the magnetic field sensor signal to determine a measure of the strength of the magnetic field sensor signal; and a measurement processor operable to determine a measure of the flow in said conduit in dependence upon the determined measure of strength of said electric field sensor signal and the determined measure of strength of said magnetic field sensor signal;

wherein said magnetic flow meter has a periodic measurement cycle, wherein said first and second processing circuits are operable to process the respective sensor signals continuously during each measurement cycle and to accumulate the respective sensor signal strengths in the measurement cycle and wherein said measurement processor is operable to determine a measure of the flow along said flow path at the end of each measurement cycle using the strength measures accumulated during that cycle.

* * * * *

UNITED STATES PATENT AND TRADEMARK OFFICE
CERTIFICATE OF CORRECTION

PATENT NO. : 6,626,048 B1
DATED : September 30, 2003
INVENTOR(S) : Andrew Nicholas Dames et al.

It is certified that error appears in the above-identified patent and that said Letters Patent is hereby corrected as shown below:

Title page,
Item [12], "dam Es et al." should read -- Dames et al. --.
Item [75], Inventors, "Dam Es, Cambridge" should read -- Dames, Cambridge --.

Column 19,
Line 45, "in-the" should read -- in the --.

Column 21,
Lines 28-29, "sensor-:signal" should read -- sensor signal --.

Column 22,
Line 4, "processor-operable to-determine" should read -- processor operable to determine --.

Signed and Sealed this

Twenty-fourth Day of February, 2004

JON W. DUDAS
*Acting Director of the United States Patent and Trademark Office*